(12) United States Patent
Shan et al.

(10) Patent No.: US 11,260,642 B2
(45) Date of Patent: Mar. 1, 2022

(54) METHODS FOR FAST AND REVERSIBLE DRY ADHESION TUNING BETWEEN COMPOSITE STRUCTURES AND SUBSTRATES USING DYNAMICALLY TUNABLE STIFFNESS

(71) Applicants: Board of Regents of the Nevada System of Ed., on behalf of the Univ. of Nevada, Reno, Reno, NV (US); The Trustees of the University of Pennsylvania, Philadelphia, PA (US)

(72) Inventors: Wanliang Shan, Reno, NV (US); Kevin Turner, Wayne, PA (US)

(73) Assignees: Board of Regents of the Nevada System of Higher Education, on behalf of the University of Nevada, Reno, Reno, NV (US); The Trustees of the University of Pennsylvania, Philadelphia, PA (US)

( * ) Notice: Subject to any disclaimer, the term of this patent is extended or adjusted under 35 U.S.C. 154(b) by 192 days.

(21) Appl. No.: 16/482,601

(22) PCT Filed: Jan. 31, 2018

(86) PCT No.: PCT/US2018/016269
§ 371 (c)(1),
(2) Date: Jul. 31, 2019

(87) PCT Pub. No.: WO2018/144618
PCT Pub. Date: Aug. 9, 2018

(65) Prior Publication Data
US 2020/0023628 A1    Jan. 23, 2020

Related U.S. Application Data

(60) Provisional application No. 62/453,207, filed on Feb. 1, 2017.

(51) Int. Cl.
  *B32B 37/12*      (2006.01)
  *B32B 7/12*       (2006.01)

(52) U.S. Cl.
  CPC ............. *B32B 37/12* (2013.01); *B32B 7/12* (2013.01)

(58) Field of Classification Search
  None
  See application file for complete search history.

(56) References Cited

U.S. PATENT DOCUMENTS

| 10,046,353 B2 * | 8/2018 | Kim ................. B05C 11/00 |
| 2010/0022710 A1 * | 1/2010 | Xie .................. C08G 59/4042 525/63 |

(Continued)

FOREIGN PATENT DOCUMENTS

WO    WO 2015/184088    12/2015

OTHER PUBLICATIONS

International Search Report and Written Opinion issued for International Application No. PCT/US2018/016269 dated May 14, 2018.

*Primary Examiner* — Peter A Salamon
(74) *Attorney, Agent, or Firm* — Klarquist Sparkman, LLP

(57) ABSTRACT

Disclosed herein are embodiments of methods that utilize dry adhesion tuning of a composite structure to adhere substrates. In some embodiments, the disclosed methods utilize dry adhesion between a composite structure and a substrate and further dynamically control the resulting dry adhesion strength through a heating step, which facilitates rigidity tuning of a core component of the composite structure and/or facilitates thermal control of the interface between the substrate and the composite structure. Also disclosed herein are array devices and other products comprising the disclosed composite structures.

4 Claims, 17 Drawing Sheets

(56) References Cited

U.S. PATENT DOCUMENTS

| | | | |
|---|---|---|---|
| 2010/0190011 A1* | 7/2010 | Cheng | B32B 27/20 428/413 |
| 2012/0202035 A1* | 8/2012 | Xie | C09J 7/00 428/220 |
| 2015/0086791 A1* | 3/2015 | Browne | B32B 7/12 428/414 |
| 2015/0344755 A1* | 12/2015 | Schneider | B32B 17/061 428/164 |
| 2015/0352586 A1* | 12/2015 | Kim | B05C 11/00 427/256 |
| 2015/0359043 A1* | 12/2015 | Kim | C09J 9/02 156/272.2 |
| 2016/0136928 A1* | 5/2016 | Zhao | B32B 9/04 428/339 |
| 2016/0167331 A1* | 6/2016 | Yang | B32B 27/20 428/206 |
| 2017/0087763 A1* | 3/2017 | Turner | B29C 41/08 |

* cited by examiner

Normalized stress for t/L = 0.35 – Non-activated

Normalized stress for t/L = 0.12 – Non-activated

Normalized stress for t/L = 0.011 – Non-activated

Normalized stress for t/L = 0.12 – Activated

METHODS FOR FAST AND REVERSIBLE DRY ADHESION TUNING BETWEEN COMPOSITE STRUCTURES AND SUBSTRATES USING DYNAMICALLY TUNABLE STIFFNESS

CROSS REFERENCE TO RELATED APPLICATION

This application is the U.S. National Stage of International Application No. PCT/US2018/016269, filed Jan. 31, 2018, which was published in English under PCT Article 21(2), which application claims the benefit of the earlier priority date of U.S. Provisional Patent Application No. 62/453,207, filed on Feb. 1, 2017, the entirety of which is incorporated herein by reference.

ACKNOWLEDGMENT OF GOVERNMENT SUPPORT

The invention was made with government support under Contract No. 1435745 awarded by the National Science Foundation. The government has certain rights in the invention.

FIELD

The present disclosure concerns embodiments of methods for controlling reversible dry adhesion of composite structures to various substrates, as well as products and devices comprising such composite structures and methods of making the same.

BACKGROUND

Tunable or switchable adhesives have many practical applications from transfer printing of semiconductor elements to climbing robots to gripping in pick-and-place manufacturing. It is desirable to have strong adhesion under one set of conditions and weak or variable adhesion under another; however, conventional adhesion methods used in the field, particularly those attempting to achieve tunable adhesion, suffer from drawbacks, such as slow actuation, insufficient change in adhesion between the low and high adhesion states, poor reversibility, or high constraint on the working environment. As such, there exists a need in the art for methods by which dry adhesion of substrates can be dynamically controlled and these drawbacks avoided.

SUMMARY

Disclosed herein are embodiments of methods for controlling dry adhesion between composite structures and substrates. In some embodiments, the methods comprise adhering a substrate to a composite structure using dry adhesion and heating the composite structure or a portion thereof to reduce dry adhesion between the substrate and the composite structure to thereby detach the substrate. In some embodiments, the methods can further comprise modifying the substrate's position using the composite structure. In some embodiments, the composite structures used in methods described herein can comprise composite structures having a shell component and a core component. In yet additional embodiments, the composite structures can comprise a heater component.

Also disclosed herein are embodiments of products comprising a substrate and a composite structure, wherein the substrate is adhered to the composite structure by dry adhesion. Also disclosed herein are embodiments of adhesive devices comprising an array of composite structures, wherein each composite structure comprises a shell component, a core component, a heater component, or any combination thereof, and wherein the adhesive device exhibits tunable dry adhesive properties capable of detaching the device from one or more substrates.

The foregoing and other objects, features, and advantages of the disclosed technology will become more apparent from the following detailed description, which proceeds with reference to the accompanying figures.

BRIEF DESCRIPTION OF THE DRAWINGS

FIGS. 15A-15D are graphs illustrating results from using the composite structure of FIG. 14 and varying the thickness t, wherein FIG. 15A shows adhesion force as a function of t/L; FIG. 15B shows adhesion strength as a function of activation voltage; FIG. 15C shows composite structure stiffness as a function of activation voltage; and FIG. 15D shows temperature of the interface between the composite structure and the glass substrate as a function of time.

FIG. 16A shows results obtained from a t/L=0.35 (nonactivated state); FIG. 16B shows results obtained from a t/L=0.12 (nonactivated state); FIG. 16C shows results obtained from a t/L=0.011 (nonactivated state) and FIG. 16D shows results obtained from a t/L=0.12 (activated state).

FIGS. 21A-21C are graphs illustrating the results of varying sealing layer thicknesses on adhesion force under varying conditions using the embodiment shown in FIGS. 18 and 19, wherein FIG. 21A shows results from an unactivated state; FIG. 21B shows results from using "cold-hot" conditions (as described herein); and FIG. 21C shows results from using "hot-hot" conditions (as described herein).

DETAILED DESCRIPTION

I. Overview of Terms

Figure 1:
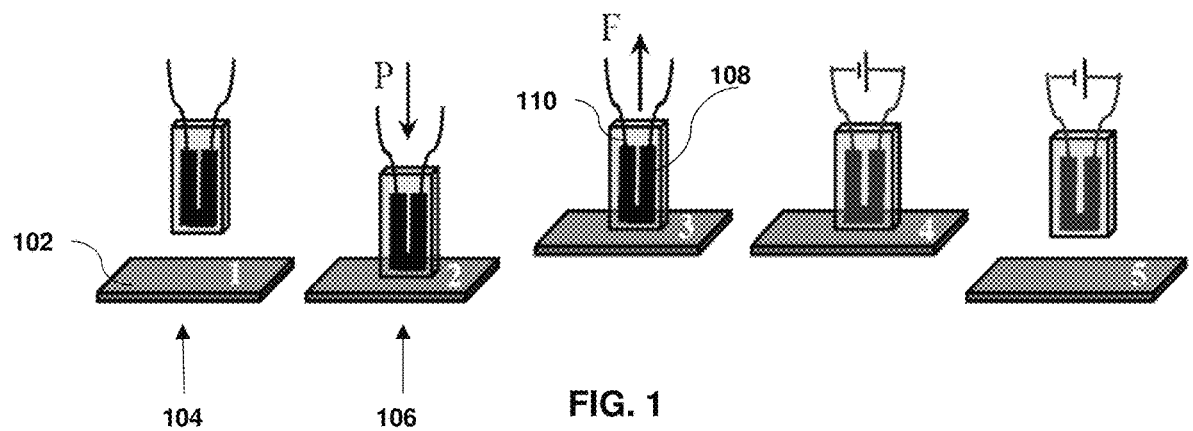
FIG. 1 is a schematic showing an exemplary method embodiment described herein whereby dynamic dry adhesion control is used to manipulate a substrate.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, voltages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximations unless the word "about" is recited.

To facilitate review of the various embodiments of the disclosure, the following explanations of specific terms are provided:

Composite Structure: A structure comprising two or more different materials that have distinct physical and/or chemical properties from one another in their natural state (e.g., uninfluenced by temperature change, a magnetic field change, an electrical change, or the like). For example, some composite structures comprise components that have different rigidities at a particular temperature. In particular disclosed embodiments, a composite structure comprises a shell material and a core material, wherein the shell material and the core material have different physical and/or chemical properties, such as a different rigidity, in their natural state. In yet additional embodiments, a composite structure can comprise two elastomer materials and a low melting point alloy that have different physical and/or chemical properties in their natural state. In yet additional embodiments, a composite structure can comprise a core material, a shell material, and a heater component material.

Core Component: A component of a composite structure that is made of a material capable of changing rigidity, typically in response to a temperature change, a magnetic field change, a change in electrical current, or change in another type of stimulus.

Dry Adhesion: Adhesion that is achieved without using fluid (e.g., liquid) in contact with opposing surfaces and in some embodiments can result from van der Waals forces or other surface interactions.

Dry Adhesion Forces: Forces that are needed to separate an interface that is adhered due to dry adhesion.

Dry Adhesion Strength: A measurement of the dry adhesion between a composite structure and a substrate, which is determined by dividing the dry adhesion force between the composite structure and the substrate by the contact area between the composite structure and the substrate.

Elastomer: A polymer with viscoelasticity (that is, having both viscosity and elasticity) and having a low Young's modulus, such that the material is flexible (particularly when compared to a rigid material). In some embodiments, an elastomer can be a thermoset polymer or a thermoplastic polymer. In embodiments where a core material comprises an elastomer, the elastomer typically includes (e.g., is embedded with, is coupled with, or is used in combination with) a component that can be physically or chemically modified to increase or decrease rigidity.

Rigid: A physical property of a material of a composite structure (e.g., a core component) that can, in some embodiments, be described by its Young's modulus and/or by comparison to a different material. In some embodiments, a rigid material can be stiffer (that is, have a greater Young's modulus) than another material. For example, a rigid material may have a Young's modulus that is two times greater than a comparison material, such as 10 times greater than a comparison material, or greater than 10 times greater. In some embodiments, a "rigid" core material is a material that is not flexible (e.g., is hard to bend) when compared to a shell material used in combination with the core material. In some embodiments, a core component can be rigid in its natural state at room temperature when compared to the shell, but will have comparable or lower stiffness than the shell after being activated. In yet other embodiments, a core component can be rigid in its natural state at temperatures below room temperature (e.g., materials that are liquid at room temperature, but that are solid at temperatures below room temperature).

Shell Component: A component of a composite structure that remains flexible regardless of a temperature change, a magnetic field change, a change in electrical current, or change in another type of stimulus.

II. Introduction

Tunable dry adhesion has many potential applications in robotics and manufacturing. Conventional methods for achieving dry adhesion control focus on using arrays of slender high-aspect-ratio fibrils made of resin and elastomers or angled wedges made of shape memory polymers. These structures, however, do not utilize a composite structure. Other conventional approaches attempt to achieve tunable adhesion by using adhesives with tunable porosity that allows for rapid removal by capillary penetration of liquids, or using tunable normal pull-off force between a composite elastomeric composite structure and a smooth surface achieved by applying different shearing pre-loads. For example, a method for controlling adhesion by applying different shearing pre-loads has been described in the art. In this method, a rigid core was embedded in a soft shell component made of polydimethylsiloxane (PDMS). By changing the distance from the rigid core to the interface and the diameter of the composite structure, this method provided the ability to increase the effective adhesive strength by approximately three times under normal loading and further reduce the adhesion by applying shear statically. This method uses a composite structure with a core having a fixed rigidity and merely controls the normal adhesion force by changing the shearing pre-loads; rigidity is not dynamically tuned in this method. Despite these conventional methods, cost effective methods providing fast reversibility of dry adhesion strength and easy implementation are still lacking in the field of dry adhesion. Conventional methods are limited by slow actuation, insufficient change in adhesion between the low and high adhesion states, poor reversibility, and the inability to reuse adhesive components.

In contrast, the present disclosure describes embodiments of methods whereby dry adhesion between a substrate and a composite structure can be dynamically manipulated by controlling the properties of the composite structure and/or by controlling interactions at the interface between a substrate and the composite structure. The methods described herein provide the ability to dynamically and reversibly control dry adhesion between a composite structure and substrate (e.g., an opposing rigid, smooth surface) within a few seconds, and in some cases, within one second. In some embodiments, the methods disclosed herein exploit elastomer-based composite structures that can comprise a soft shell component, a core component that has a stiffness (or rigidity or modulus) that can be dynamically tuned through a temperature change (or even a magnetic field change, a change in electrical current, or change in another type of stimulus), such as through the application of heat (e.g., by way of applying a voltage), and/or a heater component capable of heating the interface between the substrate and the composite structure. In yet additional embodiments, a magnet can be used to promote a change in magnetic field of a material or component of the composite structure. In some embodiments, an applied electric field leads to resistive heating in the core component and/or the heater component of the composite structure. Heating the core component changes the stiffness of the core component without influencing the surrounding shell component thereby reducing dry adhesion with the substrate. For some embodiments, the ability to change the stiffness of the core component of the composite structure using the methods disclosed herein provides the ability to tune dry adhesion in the composite structures.

In yet additional embodiments, the local temperature and stress distribution near the interface between a substrate and the composite structure can be altered. A local increase in temperature can be applied using a heater component positioned near the interface to affect the effective dry adhesion between the substrate and the composite structure at the interface. The shell component of the composite structures typically is viscoelastic and thus its dry adhesion, due to dissipative effects, is sensitive to both separation rate and temperature. As such, the heater can be used to minimize dry adhesion between the shell component and the substrate. The heater, itself, can also be rigidity tunable thus, upon heating, stress distribution in the vicinity of the interface can be modified, along with the dry adhesion.

The method embodiments described herein provide an advantage over the art as they provide fast and facile manipulation of dry adhesion utilizing stiffness tuning of composite structures. The composite structures utilized in the disclosed methods are reusable and robust, which provides an advantage over conventional dry adhesion materials. The disclosed methods also avoid the need for external heating methods (e.g., methods using ovens or other mechanisms to provide a heated surrounding environment), which reduces operation time and costs associated with implementing the methods as compared to conventional methods requiring such external heating. Using method embodiments described herein, it is possible to obtain dry adhesion change ratios that are greater than those obtained with conventional methods. In some embodiments, the disclosed methods can be used to effect changes in dry adhesion—that is, dry adhesion strength (which is measured as the dry adhesion force divided by the contact area) before and after activation of the composite material—such that dry adhesion change ratios on the order of greater than 0 to 100 or higher can be attained, such as 6 to 100, or 6 to 50, or even 10 to 40.

III. Methods of Controlling Dry Adhesion

Disclosed herein are embodiments of novel methods for controlling dry adhesion between a substrate and a composite structure by controlling properties of components of the composite structure and/or controlling interactions at the interface between the substrate and the composite structure. In particular disclosed embodiments, the methods described herein can be used in any application whereby a substrate is to be manipulated (e.g., by changing its position or other spatial or physical changes), such as robotics (e.g., pick-and-release robotic manipulators and/or climbing robots), manufacturing/assembly processes (e.g., transfer printing), and other applications where quick pick-and-release of substrates, particularly flat, rigid substrates, is utilized.

In particular disclosed embodiments, the methods are directed to actively tuning (e.g., dynamically modifying) dry adhesion strength between a composite structure and a substrate (e.g., a substrate having a rigid, smooth surface). In some embodiments, the dry adhesion strength can be actively tuned by controlling the rigidity of a core component of the composite structure. In additional embodiments, dry adhesion strength can be actively tuned by modifying the temperature and/or rigidity of the shell component of the composite structure, which is located at the interface between the composite structure and the substrate. In yet additional embodiments, a combination of modifying rigidity of the core component and the temperature and/or rigidity at the interface between the shell component and the associated substrate can be used to tune dry adhesion.

Methods described herein can comprise adhering (through dry adhesion) the substrate to the composite structure, modifying the substrate's position by moving the composite structure to which it is adhered, and/or heating the composite structure to reduce dry adhesion between the substrate and the composite structure to thereby detach the substrate. In additional embodiments, the methods can comprise an additional cooling step. In yet additional embodiments, the methods can comprise performing structural or other physical modifications to the substrate while it is adhered to the composite structure.

Adhering the substrate to the composite structure can comprise contacting the substrate with the composite structure in a manner that promotes dry adhesion between the substrate and a portion of the composite structure. The presence of a rigid core component that is positioned within a shell component of the composite structure can provide the ability to alter the stress distribution (e.g., mechanical stress distribution) at the interface between the shell component and the substrate to provide dry adhesion between the composite structure and the substrate. In some embodiments, dry adhesion between the substrate and the composite structure can occur by placing the shell component of the composite structure on a surface of the substrate (e.g., the top surface or bottom surface of the substrate) and allowing the two components to adhere together through macroscopically short-range van der Waals forces. In some embodiments, the speed by which the substrate is contacted with the composite structure can be controlled. For example, suitable contact speeds (that is, how quickly the composite structure is placed in contact with the substrate) can range from between 1 µm/s and 2000 µm/s, such as between 5 µm/s and 500 µm/s, or 5 µm/s and 200 µm/s. In particular disclosed embodiments, contact speeds can be 5 µm/s. In some method embodiments, the composite structure is held in position on the substrate for a sufficient period of time as to ensure good dry adhesion between the composite structure and the substrate. In particular disclosed embodiments, the composite structure can be held to the substrate for a time period ranging from between 0.02 minutes and 2 minutes, such as between 0.05 minutes and 1 minute, or 0.05 minutes and 0.1 minutes.

While the substrate is adhered to the composite structure, the substrate's position can be modified. For example, the substrate can be moved from one location to another in any direction such as by moving the substrate vertically or horizontally. The substrate also can be modified in other spatial orientations (e.g., turned, flipped, or other such movements) by using the composite structure to control such movements.

When desired, the substrate can be detached from the composite structure by heating the composite structure in a manner sufficient to reduce the dry adhesion between the substrate and the composite structure. In particular disclosed embodiments, the composite structure can be heated directly. Direct heating can involve exposing the core component and/or a portion of the shell component of the composite structure to a heated environment (e.g., hot air or radiant heat) or simply allowing the composite structure to warm to room temperature. In particular disclosed embodiments, direct heating can occur by exposing the shell component and/or the core component of the composite structure to an electrical current (e.g., resistive heating). By heating the core component of the composite structure, the physical and/or chemical properties of the core component can be altered such that the composite structure becomes less rigid (or stiff) than it is before heating. In yet additional embodiments, a portion of the shell component of the composite structure that is located at the interface between the composite structure and the substrate can be heated to provide a thermal effect, or a combined thermal and rigidity tuning effect, that reduces dry adhesion at the interface. Such embodiments can be used to avoid having to heat the entire composite structure or a component thereof.

In embodiments utilizing an electrical current to heat the composite structure, the electrical current can be provided at a particular activation voltage, which can be selected based on the structural features of the core and/or shell components of the composite structure as described herein. In particular disclosed embodiments using CPBE as the rigidity tunable core material, the activation voltage can range from 10 volts to 150 volts, such as between 20 volts and 80 volts, or 20 volts and 30 volts. In exemplary embodiments, activation voltages of 20 and 30 volts can be used. In some embodiments, the activation voltage can be applied repeatedly and intermittently using a battery.

The composite structure can be exposed to the electrical current for a sufficient amount of time so as to heat the core component, the shell component, and/or the entire composite structure. In particular disclosed embodiments, the amount of time needed to heat the composite structure, or a component thereof, can be increased or reduced by varying the activation voltage used. Higher activation voltages utilize less heating time, whereas lower activation voltages utilize more heating time. Like the activation voltage, the amount of time during which the composite structure is heated can depend on the size and/or materials of the components of the composite structure. In particular disclosed embodiments, the heating time can range from 0.01 minutes to 5 minutes, such as from 0.01 minutes to 1 minute, or 0.01 minutes to 0.1 minutes. In exemplary embodiments, the composite structure was heated for 2 minutes using an activation voltage of 20 or 30 volts.

In some embodiments, the heating step can be conducted using an on-board heater component that is attached to a portion of the shell component of the composite structure. The heater component can be activated to deliver heat to the composite structure such that the shell component (or a portion thereof) at the interface is heated to thereby influence the dry adhesion between the composite structure and the substrate, or such that the rigidity of the core component is modified to thereby influence dry adhesion between the composite structure and the substrate. The heater component can be controlled using an external power source, such as a battery.

After the composite structure has been activated through heating, the dry adhesion of the interface between the composite structure and the substrate is reduced, thereby facilitating detachment of the substrate from the composite structure. Unlike conventional methods, the disclosed methods provide the ability to detach the substrate from the composite structure with minimal force, which not only provides a more facile method for manipulating substrates but further maintains the structure integrity of the substrate.

An exemplary method is illustrated schematically in FIG. 1. As shown in the embodiment of FIG. 1, a composite structure 100 is brought into contact by force P with a surface 102 of substrate 104 so as to adhere the two components together through dry adhesion to form product 106. The position of substrate 104 can be modified, such as by lifting substrate 104 using force F as illustrated in FIG. 1. Dynamic dry adhesion control can be used to drop the substrate by activating the core component 108 of composite structure 100, which is positioned within shell component 110, using heat. After heating core component 108, the modulus of core component 108 reduces to be comparable to or less than that of shell component 110, and thus the effective dry adhesion strength of the interface drops and substrate 104 can be detached from composite structure 100, as illustrated in FIG. 1.

The effective dry adhesion strength of the shell component of the composite structure is a function of multiple factors, such as work of dry adhesion, which can depend on temperature; viscoelastic dissipation during peeling, which can be a function of peeling rate and temperature; the geometry and elastic heterogeneity in the shell material near the interface; stress distribution at the interface; or any combination thereof. Without being limited to a particular theory, it is currently believed that the effective dry adhesion strength of the composite structures can be modified through the geometry and elastic heterogeneity in the shell component near the interface due to the change in stiffness of the core component of the shell, as well as by modifying the work of dry adhesion and viscoelastic dissipation during peeling by controlling temperature. "High" dry adhesion states can be achieved, which refers to embodiments where the core component is rigid (or stiff). "Low" dry adhesion states also can be implemented, which refers to embodiments where the core component becomes less rigid (or stiff). Without being limited to a particular theory, it is currently believed that the methods disclosed herein whereby the rigidity of the composite structure is modified using heat provide the ability to alter the stress distribution close to the interface between the composite structure and the substrate, thus impacting the interfacial crack initiation and propagation process.

In yet additional embodiments, heat is used to directly influence the temperature and/or stress distribution of the interface region between the composite structure and the substrate thereby reducing dry adhesion between the two components using thermal control. Thermal control of the interface region can involve tuning any one or more of the stress distribution at the interface, the adhesive forces between the substrate and the composite structure, the material properties (e.g., viscoelasticity) of the components at the interface, and any combination thereof. In some embodiments, the dry adhesion between the substrate and the composite structure can be actively tuned by controlling rigidity of the composite structure in combination with direct heat control of the dry adhesion interface. In such embodiments, the method can, but need not, comprise two separate heating steps.

In some embodiments, the core component of the composite structure can be converted back to its rigid (or stiff) state after the heating step that "activates" the core component (that is, the heating step that reduces the core component's rigidity). For example, the composite structure can be cooled to induce rigidity. Cooling can comprise an affirmative cooling step where, for example, the composite structure is exposed to a temperature effective to increase the rigidity of the core material, such as by increasing the Young's modulus of the core material within the composite structure. In yet additional embodiments, cooling can comprise simply allowing the core material of the composite structure to dissipate any absorbed heat from the heating step, thereby effectively cooling the core material and increasing its rigidity.

The methods disclosed herein also can be used to control dry adhesion between arrays of composite structures and substrates. In such embodiments, the arrays can comprise a plurality of composite structures as described herein, wherein each composite structure is further attached to an array substrate. A target substrate can be contacted with the array such that the plurality of composite structures is effectively adhered to the target substrate through dry adhesion. All, or a portion, of the composite structures can be adhered to the target substrate. In some embodiments, all composite structures of the array can be individually heated using methods described above, or the array substrate can be heated so as to provide sufficient heat to the composite structures to reduce the dry adhesion strength between the composite structures and the target substrate.

In some embodiments, the methods described herein provide the ability to achieve dry adhesion change ratios that are higher than conventional methods. Dry adhesion change ratios can be measured by evaluating the dry adhesion forces and/or the dry adhesion strength exhibited by the composite structure in both an "activated" mode and a "non-activated" mode. An "activated" mode typically refers to composite structures wherein the core component exhibits less rigidity and a "non-activated" mode typically refers to composite structures wherein the core component exhibits more rigidity.

Figure 2:
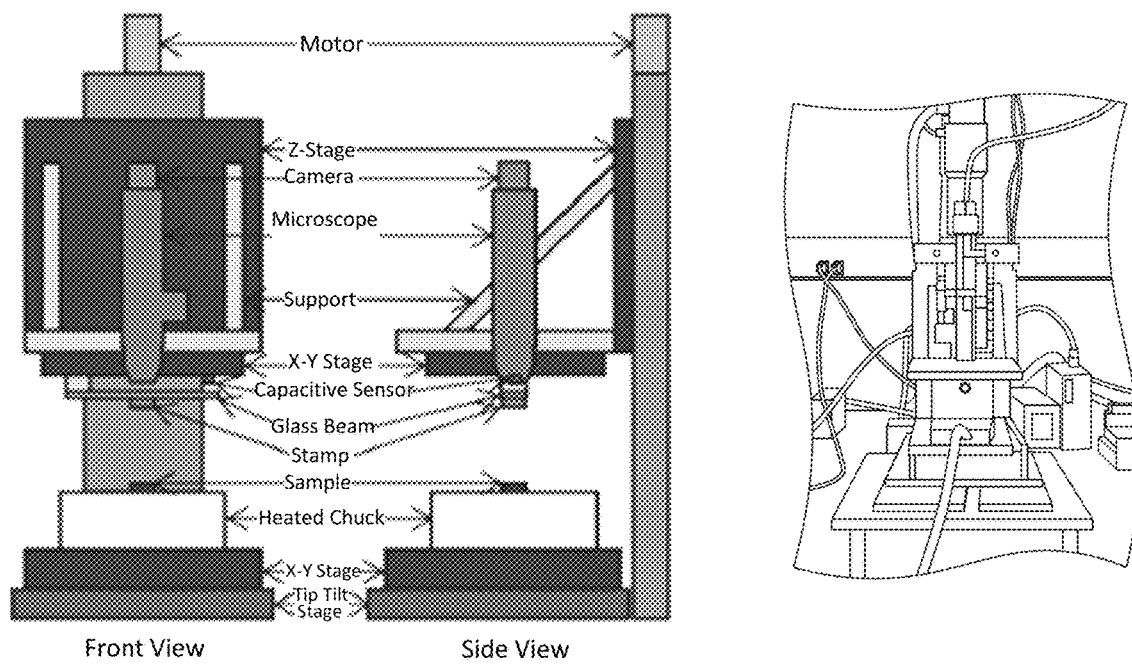
FIG. 2 is an illustration (left) and photographic image (right) of an exemplary small-scale mechanical testing system that can be used to evaluate dry adhesion tuning in temperature dependent method embodiments described herein.

In some embodiments, dry adhesion can be measured using techniques known in the art and with the benefit of this disclosure. In some embodiments, the composite structures are tested in a custom small-scale mechanical testing system (FIG. 2). The system comprises a vertically mounted stepper motor driven translation stage (Aerotech M511) with a large dynamic range (up to 300 mm/s), a low range load cell, and integrated optics to view the contact and ensure alignment. A sample stage is modified to allow for heating of the sample (e.g., the substrate) up to 100° C. through resistive cartridge heaters embedded in the stage. An insulated environmental chamber is used to ensure uniform heating of the composite structure and the composite structure holder will be thermally isolated from the load cell. Using this modified setup, dry adhesion can be probed through composite structure pull-off tests at temperatures from 25 to 100° C. and different loading rates.

In embodiments utilizing micro-scale composite structures, the performance of the micro-scale composite structures can be characterized on the single-structure level using a similar setup as discussed above. The setup can be fitted with a load cell with a full scale range load cell of 100 mN to allow measurement of dry adhesion on composite structures with diameters ranging from 10-100 µm. The composite structures are mounted in the system, aligned to the substrate optically, and then brought into contact under a fixed preload. Pull-off force will be measured by retracting the composite structure from the surface and measuring the peak load. Dry adhesion of the composite structures is measured as a function of applied voltage and displacement rate. Measurements can be performed on embodiments with different geometries and configurations of the core component, the on-board heater, and/or the shell component, which are described herein.

As discussed herein, the disclosed methods can be applied in a variety of applications and conditions. In particular disclosed embodiments, the methods can be used for handling substrates, such as semiconductor wafers and/or display screens (e.g., phone display screens), during manufacturing and assembly. Semiconductor wafers often are fragile and brittle and thus must be handled with care and precision and phone displays must be handled to avoid cracks, scuffing, or other physical deformations. The methods disclosed herein allow for efficient, cost effective, and delicate handling of such substrates, a need that has not yet been met in the art.

A. Composite Structures

Figures 8A, 8B:
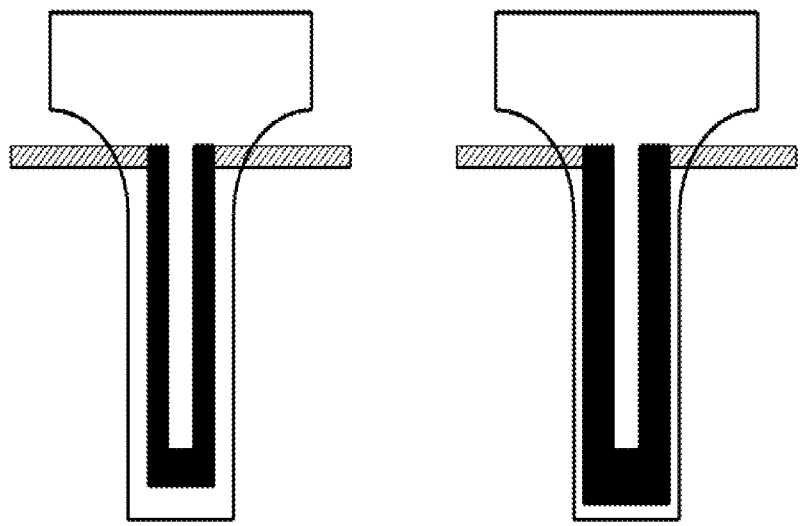
FIGS. 8A and 8B illustrate two different composite structure embodiments comprising thin (FIG. 8A) and wide (FIG. 8B) core components.

In some embodiments, the composite structures used in the methods disclosed herein are composite materials comprising a core-shell structure. Thus, the composite structures comprise a core component that is surrounded by a shell component. The core component of the composite structure can comprise materials capable of rigidity tuning—that is, materials that can be converted from being rigid to being flexible. The core component serves as a tunable component, which is orders of magnitude more rigid (or stiffer) than the shell component at room temperature (or, in some embodiments, below room temperature and has a stiffness that is comparable to or less than the shell component when heated. In some embodiments, the core component is not distributed randomly throughout the matrix, but rather has a specific structure to maximize impact of stiffness tuning on dry adhesion. Exemplary core structures are illustrated in FIGS. 8A and 8B.

In particular disclosed embodiments, materials capable of rigidity tuning include materials that are susceptible to heat such that the material softens (e.g., the Young's modulus of the material is reduced) when exposed to a particular temperature or electrical current. In some embodiments, the core comprises a material that is rigid at room temperature, but that becomes soft/flexible when heated to a temperature above the material's glass transition temperature. In some embodiments, materials having a glass transition temperature of 75° C. can be used, which permits a fast activation for rigidity tuning. In some embodiments, the material can be less rigid at room temperature and more rigid at temperatures below room temperature.

Exemplary core materials include, but are not limited to, conductive propylene-based elastomers ("CPBE"), such as polypropylene elastomers comprising embedded/dispersed conductive carbon materials (e.g., carbon black particles); low melting point alloys ("LMPA"), such as Galinstan (having a melting point of −19° C.), Eutectic Gallium Indium (EGaIn) (having a melting point of 15.5° C.), Field's metal (having a melting point of 62° C.), as well as Bismuth-based alloy materials (e.g., an alloy having a melting point of 47.2° C.); composite materials comprising elastomers (e.g., PDMS or other siloxanes, Ecoflex® materials, which are platinum-catalyzed silicone materials, and the like) embedded with LMPA materials, porous elastomeric composites comprising LMPA materials and air bubbles; magnetorheological elastomers, which are a class of solids that comprise a polymeric matrix with embedded micro- or nano-sized ferromagnetic particles, such as carbonyl iron (and as a result, the mechanical properties of these materials can be controlled by the application of magnetic field); electrorheological elastomers, which are elastomers comprising dispersed polarizable particles within the elastomer matrix (and as a result they have tunable dynamic properties that can be harnessed by applying an electric field); and any combinations thereof.

In some embodiments, LMPA materials, both in bulk form and in elastomer-based composite form, can be used to produce the core component. In yet additional embodiments, a combination of LMPA materials, such as Field's metal and Galinstan/EGaIn, can be used to make a composite with tunable rigidity, wherein an elastomeric layer containing microfluidic channels filled with Galinstan/EGaIn serves as a soft heater and a second vertically aligned elastomeric layer containing a block of Field's metal serves as rigidity tunable core component. Due to their extremely low electrical resistivity ($\sim 3 \times 10^{-7}$ $\Omega \cdot$m), LMPAs are suitable for micro-scale embodiments of the composite structures, where fast activation by a small sized power supply, such as a battery, is possible.

The shell component of the disclosed composite structures typically comprises an elastomer material. Elastomers have a low elastic modulus (e.g., 10 kPa-1 MPa) and can elastically accommodate roughness on surfaces, thus allowing dry adhesion via macroscopically short-range van der Waals forces. Exemplary shell materials include, but are not limited to, PDMS, Ecoflex® (a platinum-catalyzed silicone material), Elastosil® (silicone rubber-based materials consisting essentially of silicone polymers and fillers), and combinations thereof.

Figure 3:
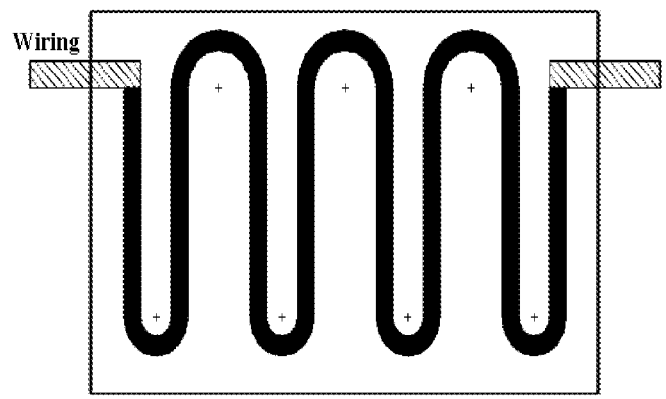
FIG. 3 illustrates a thin elastomer layer containing serpentine channels of a low melting point alloy material, which can be used as a heater and/or a rigidity tunable component to control dry adhesion.
Figure 4:
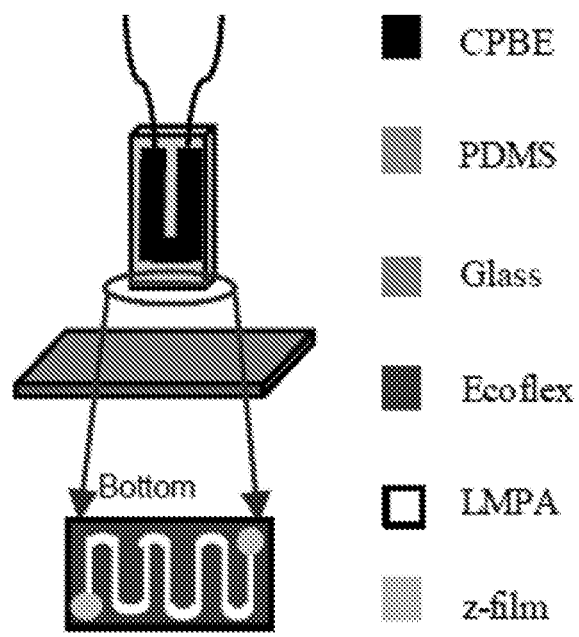
FIG. 4 illustrates an embodiment of a composite structure disclosed herein comprising a core component with tunable rigidity and heater component.
Figure 18:
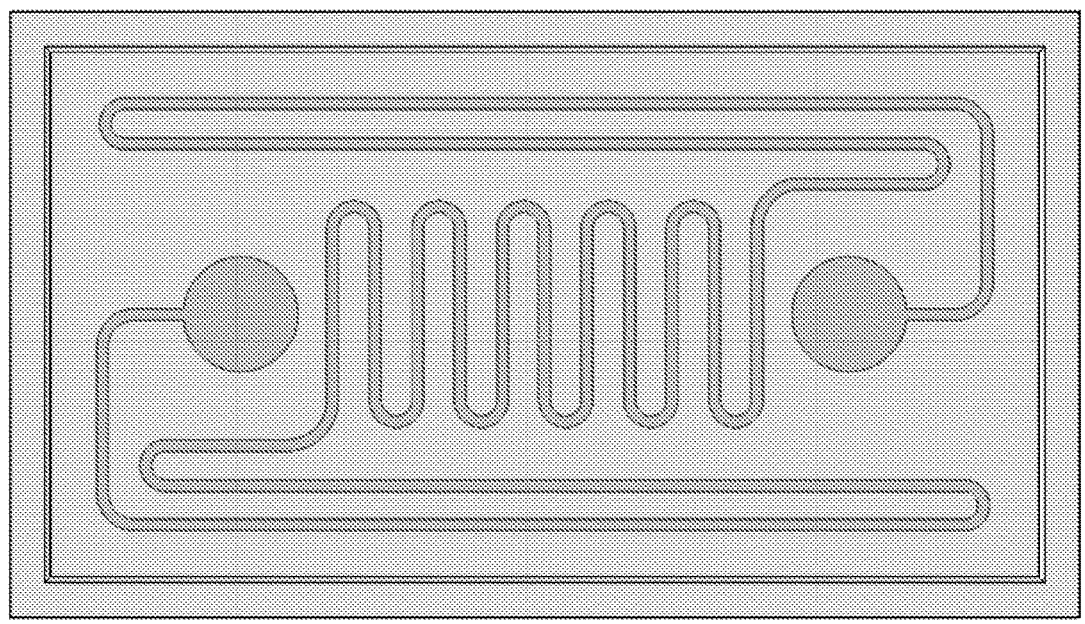
FIG. 18 is a bottom plan view of a main body of an embodiment of a composite structure.
Figure 19:
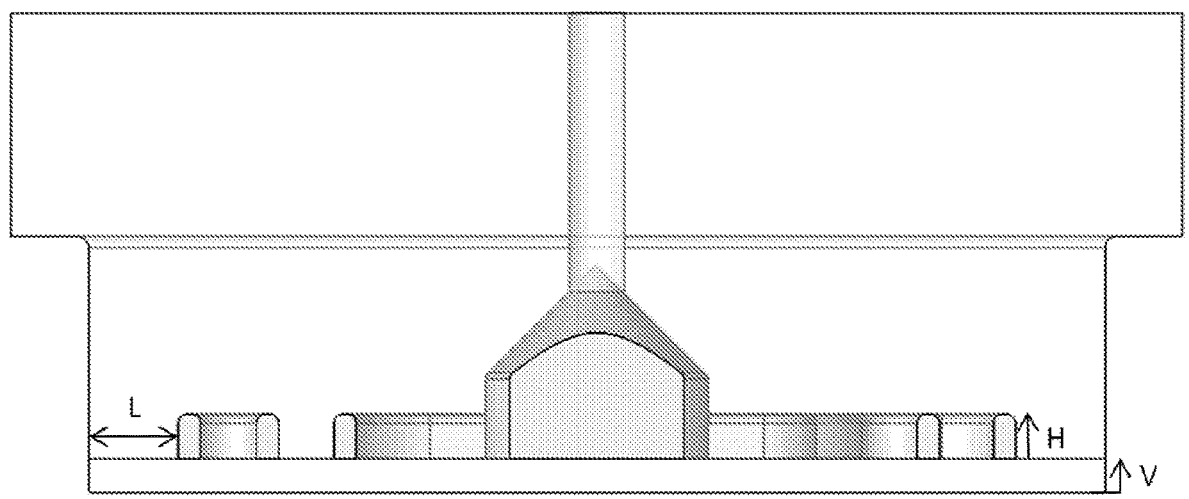
FIG. 19 illustrates a cross-sectional view of the main body of FIG. 18.

In additional embodiments, the composite structure can comprise a heater component that is coupled to the composite structure. The heater can be a soft heater made of a thin elastomeric material layer. This thin layer of material can be configured to comprise one or more channels in which an LMPA material can be embedded. In some embodiments, the LMPA material can be positioned within channels formed in the elastomer material. The channels can be any suitable dimension and can be macrochannels, microchannels, and even nanochannels. Any configuration can be used to pattern the channels. In some embodiments, a serpentine configuration, such as that illustrated in FIG. 3, can be used. In other embodiments, a configuration such as that illustrated in FIG. 18 can be used. Also, as shown in FIG. 19, the electrode wells can have a conical shape to help keep material in the channel under compressive loading. Other configurations are contemplated, such as, but not limited to, spiral confirmations, parallel channel configurations, starfish configurations, and the like. Such heater embodiments can be used in the heating step of the disclosed methods to promote a thermal effect on dry adhesion between the substrate and the composite structure. An exemplary composite structure comprising an on-board heater component is illustrated in FIG. 4.

Figure 5:
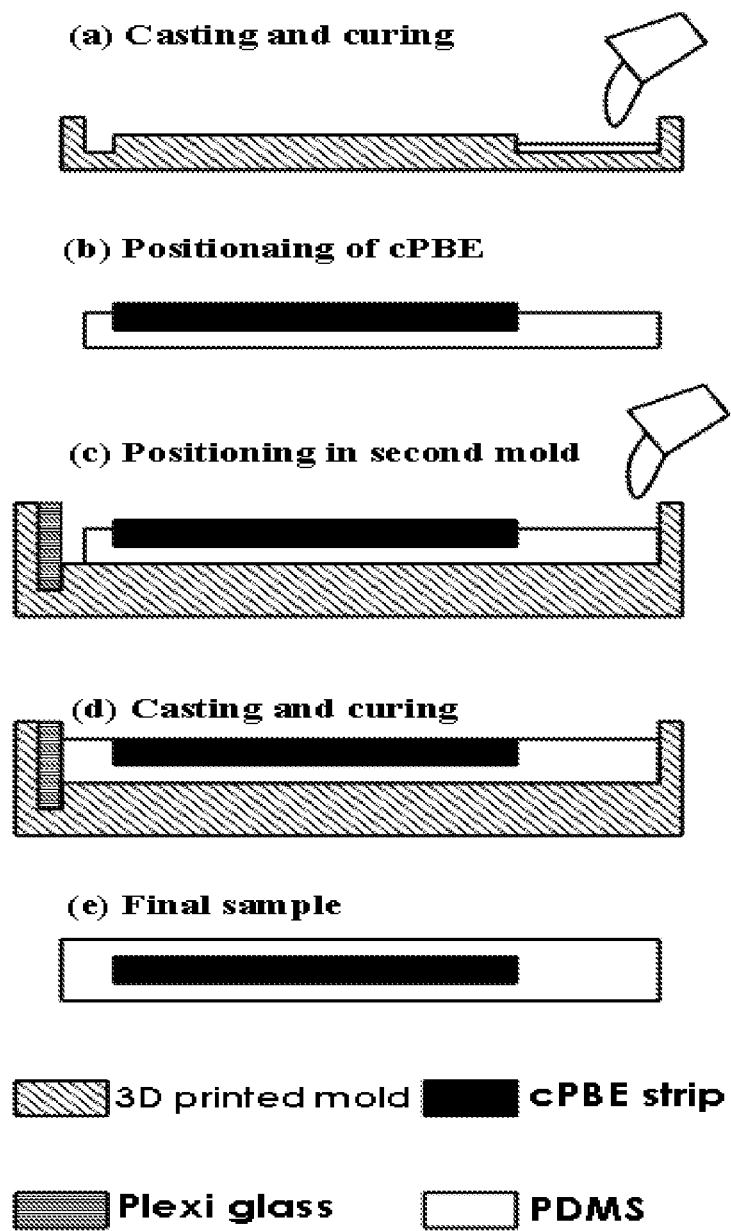
FIG. 5 illustrates exemplary fabrication steps used to prepare an exemplary composite structure comprising a shell and core component.
Figure 6A:
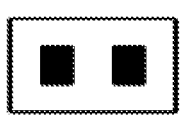
FIGS. 6A-6C illustrate top-down (FIG. 6A), side (FIG. 6B), and cross-sectional (FIG. 6C) views of an exemplary composite structure containing a rigidity tunable core component.
Figure 6B:
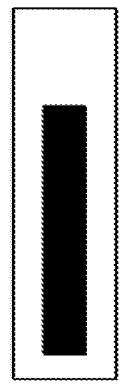
Figure 6C:
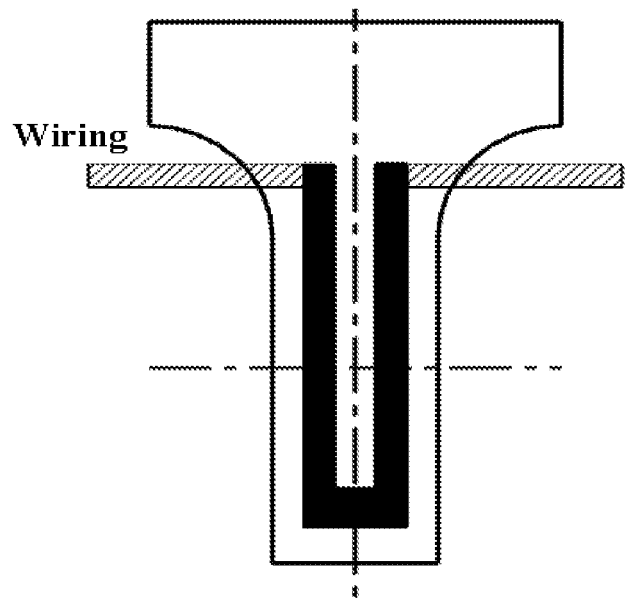

In some embodiments, the composite structure is fabricated by including a laser-patterned rigidity tunable elastomer strip (e.g., CPBE) into a softer elastomer shell using a step-by-step elastomer casting procedure. In particular embodiments, strips of the core material are embedded in the elastomer shell using the step-by step fabrication method described in FIG. 5. With reference to FIG. 5, a cured elastomer shell is prepared using a 3-dimensional printed mold and can comprise one or more printed channels. The core material is then placed into the printed channel. In particular disclosed embodiments, the core material can be pre-formed into strips (or other shapes). In embodiments utilizing strips of the core material, the core material is first heated and pressed with a heat press machine to facilitate molding of the material into a uniform sheet. $CO_2$ laser patterning can be used to provide the core material in a desired shape or configuration. Once embedded in the shell material, the shell and embedded core material can then be placed into another 3-dimensional printed mold that is deeper so that additional shell material can be introduced and cured to provide a core material enclosed by the shell material. An exemplary composite structure made according to the fabrication methods described herein is illustrated in FIGS. 6A-6C.

Figure 7:
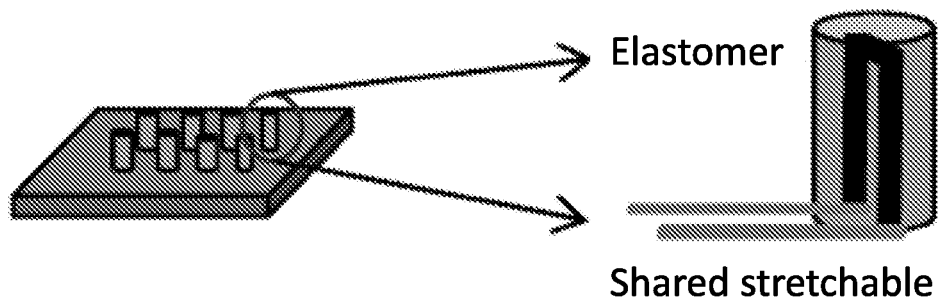
FIG. 7 illustrates an exemplary array device wherein a plurality of composite structures is included to provide an array device capable of dynamically tunable dry adhesion.

In some embodiments, the core-shell structure is fabricated to comprise narrow, thin layer(s) of a copper component to provide wiring used to implement heating the composite structure. In some embodiments, copper wiring can be coupled to the ends of the core. In yet additional embodiments, a one-directional z-film can be used. Such embodiments utilize an elastomer based z-film, which provides the ability to heat the composite structure using a much tougher elastomer-elastomer interface between the composite structure and the heat source. Using a z-film also allows for assembling arrays of composite structures, which are discussed herein. In such embodiments, the individual composite structures of the array can be circuited in a parallel manner such that malfunctioning of some of them does not fail the whole device (FIG. 7).

Figures 9A, 9B:
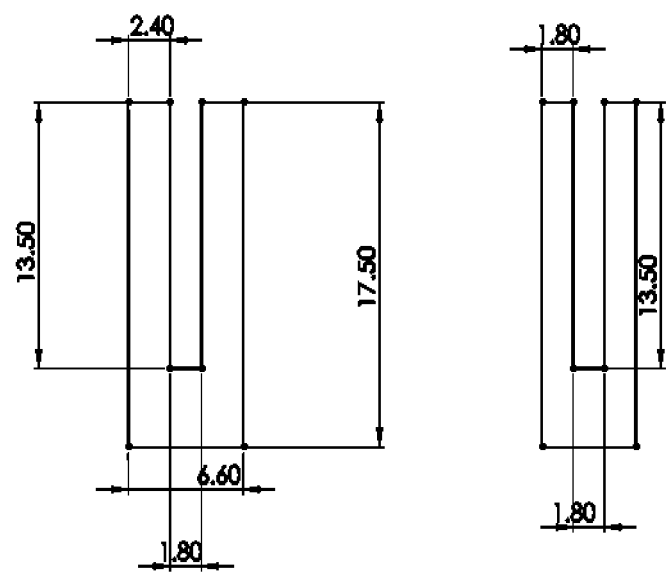
FIGS. 9A and 9B illustrate exemplary dimensions of the composite structure embodiments illustrated in FIGS. 8B and 8A, respectively.

An exemplary schematic of a core-shell composite structure is illustrated in FIGS. 8A and 8B. FIG. 8A illustrates an embodiment of a composite structure that includes a narrow core component and FIG. 8B illustrates an embodiment of a composite structure that includes a wider core component. FIGS. 9A and 9B provides exemplary dimensions (in mm) of the two core components illustrated in FIGS. 8B and 8A, respectively. These dimensions are not intended to be limiting and are provided solely as exemplary dimensions. In some embodiments, the core component comprises a CPBE material. The CPBE material can be produced in different dimensions, which can direct the activation voltage needed to heat the core material. For example, in some embodiments, CPBE strips having dimensions of 0.65 mm×2 mm×78 mm and having a resistivity of ~0.05 Ω·m at room temperature can be fully activated through self-Joule heating by applying a constant voltage ~100 V within seconds. In other embodiments, thicker and shorter CPBE strips can be activated with much lower voltage (e.g., 20V) within seconds. CPBE strips also are self-insulating since their resistivity increases exponentially with temperature, which protects the composite structures from overheating and burning, thus allowing for repeated use, unlike conventional materials.

B. Substrates

Examples of suitable substrates include, but are not limited to, substrates comprising acrylic polymers (e.g., polyacrylates or polyalkylmethacrylates, such as polymethylmethacrylates, polyethylmethacrylates, or polypropylmethacrylates), polyurethanes, polycarbonates, polyesters, polyalkylterephthalates (e.g., polyethyleneterephthalate (PET), polypropyleneterephthalates, or polybutyleneterephthalates), polyvinyl chloride (PVC), polyethers, polyamides, polyimides, glycol-modified polyethylene terephthalate, polysiloxane or copolymers thereof In yet additional embodiments, the substrates can comprise metals, such as, but not limited to, galvanized steel, stainless steel, copper, nickel, aluminum, superalloys, gold, silver, tungsten, molybdeumn, tantalum, brass; mineral substrates, such as, but not limited to, silica, silicon, silicon dioxide, quartz, diamond, sapphire; ceramic substrates; tile substrates; glass substrates; or mixtures or combinations of any of the above.

Any size substrate can be utilized in the methods disclosed herein. The substrate also can be any shape and thickness. In particular disclosed embodiments, the substrate should be sufficiently smooth so as to suitable for adhering to the composite structure through dry adhesion. Exemplary substrates include, but are not limited to, semiconductor wafers, displays (e.g., cellular phone displays), glass sheets, smooth metal components, and the like.

C. Products

Also disclosed herein are products that comprise a substrate adhered to a composite structure as described herein. In some embodiments, the products can comprise one or more substrates adhered to a plurality of composite structures of an array device. The composite structures of such products can comprise any of the components described herein, such as a shell component, a core component, a heater component, or a combination thereof.

IV. Overview of Several Embodiments

Disclosed herein are embodiments of a method, comprising: adhering a substrate to a composite structure using dry adhesion; and modifying the composite structure or a portion thereof to reduce dry adhesion between the substrate and the composite structure to thereby detach the substrate from the composite structure.

In some embodiments, modifying the composite structure or a portion thereof comprises heating the composite structure, exposing the composite structure to a magnetic field, exposing the composite structure to an electrical field, or any combination thereof.

In any or all of the above embodiments, the composite structure comprises a shell component.

In any or all of the above embodiments, the composite structure further comprises a core component.

In any or all of the above embodiments, the core component comprises a rigidity tunable material or structure. In some embodiments, the rigidity tunable material is a conductive propylene-based elastomer, a low melting point alloy, or a combination thereof; a magnetorheological elastomer; or an electrorheological elastomer.

In any or all of the above embodiments, the shell component comprises a flexible elastomer material.

In any or all of the above embodiments, the composite structure comprises one or more conductive wires and/or a heater component. In some embodiments, the heater component is attached to a portion of the composite structure that is in contact with the substrate and in some additional embodiments, the heater component comprises an elastomer configured with one or more channels comprising a low melting point alloy.

In any or all of the above embodiments, adhering the substrate to the composite structure comprises contacting the substrate with a portion of the composite structure to invoke dry adhesion.

In any or all of the above embodiments, contacting comprises allowing the substrate and the portion of the composite structure to touch for 0.02 minutes to 2 minutes.

In any or all of the above embodiments, heating the composite structure comprises using resistive heating.

In any or all of the above embodiments, heating the composite structure comprises applying a voltage to the one or more conductive wires or the heater component. In some embodiments, the voltage ranges from 1 volt to 100 volts.

In any or all of the above embodiments, the method can further comprise cooling the composite structure. In some embodiments, cooling comprises allowing the composite structure to dissipate heat. In yet additional embodiments, cooling comprises affirmatively cooling the composite structure by exposing the composite structure to a temperature effective to increase rigidity of a core component of the composite structure.

In any or all of the above embodiments, the method further comprises modifying the substrate's position using the composite structure. In some embodiments, modifying the substrate's position comprises moving the substrate in a vertical direction, a horizontal direction, or both.

Also disclosed herein are embodiments of a product, comprising: a substrate; and a composite structure, wherein the substrate is adhered to the composite structure by dry adhesion.

In some embodiments, the substrate is a substrate comprising a flat, rigid, smooth surface.

In any or all of the above embodiments, the substrate is a semiconductor wafer, display, glass sheet, or smooth metal components. In any or all of the above embodiments, the composite structure comprises a shell component.

In any or all of the above embodiments, the composite structure further comprises a core component. In some embodiments, the core component comprises a rigidity tunable material or structure and in some additional embodiments, the rigidity tunable material is a conductive propylene-based elastomer, a low melting point alloy, or a combination thereof; a magnetorheological elastomer; or an electrorheological elastomer.

In any or all of the above embodiments, the shell component comprises a flexible elastomer material.

In any or all of the above embodiments, the composite structure comprises one or more conductive wires and/or a heater component. In some embodiments, the heater component is attached to a portion of the composite structure that is in contact with the substrate.

In any or all of the above embodiments, the heater component comprises an elastomer configured with one or more channels comprising a low melting point alloy.

Some embodiments concern a method, comprising: adhering a flat, rigid, substrate to a shell component of a composite structure using dry adhesive forces, wherein the composite structure further comprises a core component, a heater component, or a combination thereof; modifying the substrate's position with the composite structure to which the substrate is adhered; and heating the shell component and/or the core component of the composite structure to reduce the dry adhesive forces between the substrate and the composite structure by modifying the rigidity of the core component and/or modifying the temperature at an interface between the substrate and the shell component to thereby detach the substrate.

Also disclosed herein are embodiments of an adhesive device, comprising an array of composite structures, wherein each composite structure comprises a shell component, a core component, a heater component, or any combination thereof, and wherein the adhesive device exhibits tunable dry adhesive properties capable of detaching the device from one or more substrates.

V. EXAMPLES

Example 1

In this example, PDMS shell embodiments with narrow and wide CPBE core strips are described. In this example, the core material had a Young's modulus of 175.5 MPa at room temperature. Its rigidity is reduced to less than that of the PDMS shell if heated above its glass transition temperature of 75° C. The shell component was made of PDMS with a Young's modulus of about 2 MPa. The composite structure had a rectangular cross section of 3 mm×8 mm. The CPBE core was a U-shaped strip with two different cross sectional areas: (1) "wide": 2.4 mm×1.5 mm and (2) "narrow": 1.8 mm×1.3 mm. The bottom of the U shape is 0.8 mm away from the PDMS/glass interface when the composite structure is adhered to a glass substrate.

When the stiff core is placed inside a PDMS shell, the pull-off force will be enhanced due to the altered stress distribution at the interface that reduces the stress at the edge. By softening the rigid CPBE core to have a modulus that is less than or equal to the modulus of the PDMS, the stress distribution at the interface will be altered and the peak stress will be at the edge. This makes it easier for a crack (or separation) to initiate and reduces the dry adhesion strength.

The composite structures in this example were made using a step-by-step manufacturing process, as shown in FIG. 5. First, a rigid mold was printed using a 3D printer with protrusions that form channels for the CPBE strips. Then, uncured PDMS (10:1 ratio) was cast into the mold, degassed and cured at 90° C. for one hour. Next, the cured PDMS film was removed from the mold and flipped over for positioning of CPBE strips. Finally, a top-sealing layer of PDMS was added by casting PDMS and then curing at 60° C. for three hours in another 3D-printed mold. In this mold, an extra space at the distal end of the composite structure is provided such that a flat PDMS surface is formed upon curing against a smooth acrylic sheet (Plexiglass) that is positioned vertically. In some embodiments, a $CO_2$ laser patterned plexi glass is used to guarantee surface smoothness of the PDMS post and it was not sprayed with any mold release spray. This process results in the desired composite structure with PDMS as shell and a core component with tunable rigidity embedded inside.

The resistance of the CPBE strips were measured to be ~300 Ω and ~700 Ω for the wide and narrow embodiments, respectively. A preliminary ANSYS™ Multiphysics simulation was used to estimate the time and voltage needed for softening of the CPBE core. The simulations showed that they could be activated within two minutes by applying constant voltages of 20 V and 30 V for the wide and narrow embodiments, respectively, with no risk of overheating or burning. The embodiments could cool down to lab temperature five minutes after removing the applied voltage. In some embodiments, the heating/cooling times can be significantly reduced by altering the geometry of the composite structures.

Figure 10A:
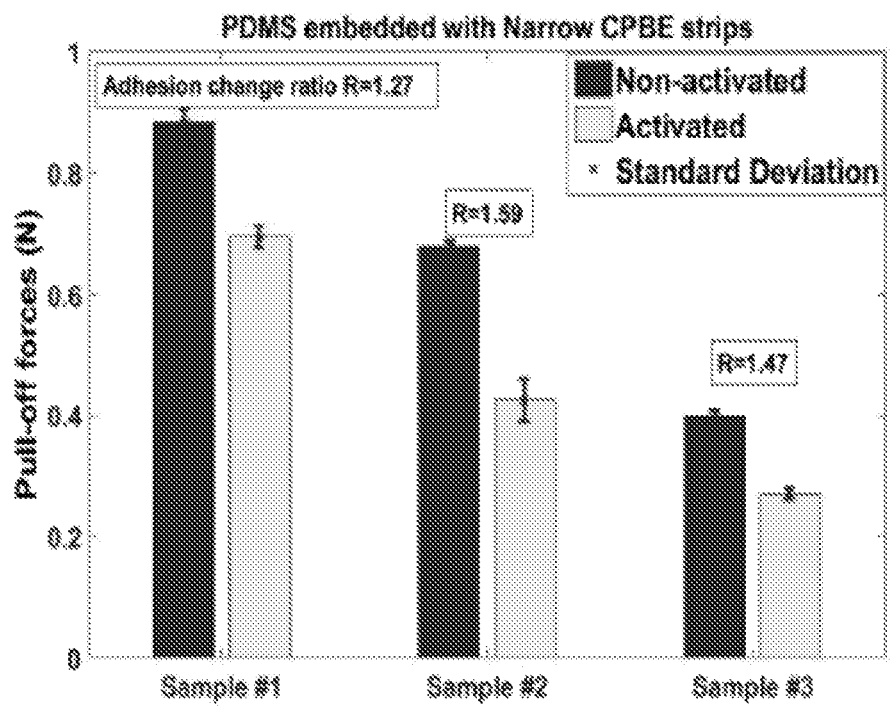
FIGS. 10A and 10B are bar graphs illustrating results showing dry adhesion tuning in composites structures with two different sized core components shown in FIG. 8A, 8B, 9A, and 9B; in both embodiments, the dry adhesion decreases when the core compound of the composite structure is activated and becomes less rigid.
Figure 10B:
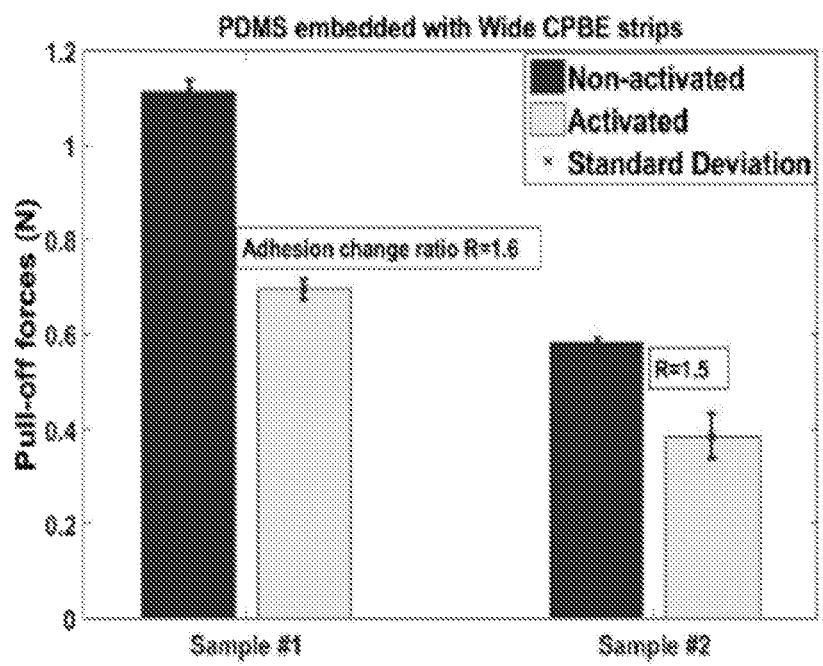

Results from dry adhesion pull-off tests are shown in FIGS. 10A and 10B. These embodiments utilized a loading rate of 5 μm/s on composite samples containing CPBE strips with the aforementioned sizes showed pull-off forces that change with rigidity tuning. The narrow CPBE strip with 1.8 mm×1.3 mm cross sectional area exhibited less tunability of the pull-off force when compared to the wide CPBE strip with 2.4 mm×1.5 mm cross section. The pull-off force change ratios were ~1.45 and ~1.55, respectively, based on testing of the samples. The dry adhesion change ratio can be significantly improved by changing the geometry of the composite structure, such as by reducing the thickness of the shell layer between the core and the adhered interface. Without being limited to a particular theory, it is currently believed that, due to the dependence of elastomer dry adhesion on temperature and the high thermal expansion coefficient of PDMS relative to glass, the temperature change (~50° C.) needed to activate CPBE strips may also contribute to the observed pull-off force change.

The results of this example for determining dry adhesion change ratio are provided by Table 1, which includes data for both the "wide" and "narrow" CPBE embodiments. As discussed herein, dry adhesion change ratio is the ratio of dry adhesion force and/or dry adhesion strength value for non-activated state to that of activated state. It can be clearly seen that in the activated state, pull-off force drops and the dry adhesion change ratio is around 1.5 for most of the embodiments.

TABLE 1

Results of adhesive pull-off tests of embodiments from Example 1. Each sample was tested three times to calculate the average and standard deviation.

| | PDMS composite structures embedded with wide CPBE strips | | PDMS composite structures embedded with Narrow CPBE strips | | |
|---|---|---|---|---|---|
| Sample Number | #1 | #2 | #1 | #2 | #3 |
| Dry Adhesion Force Before Activation (N) | 1.112 ± 0.026 | 0.58 ± 0.01 | 0.88 ± 0.023 | 0.677 ± 0.009 | 0.4 ± 0.007 |
| Dry Adhesion Force After Activation (N) | 0.696 ± 0.021 | 0.38 ± 0.046 | 0.69 ± 0.018 | 0.425 ± 0.034 | 0.27 ± 0.009 |
| Dry Adhesion Change Ratio | 1.6 | 1.5 | 1.27 | 1.59 | 1.47 |

Example 2

In this example, PDMS composite structure embodiments with onboard surface heating layers are described. The dry adhesion is tuned in such PDMS composite structure embodiments using a soft heater at the interface of the soft shell component to an opposing rigid surface. The soft heater is made by embedding LMPA to micro channels created inside the PDMS using the photolithography method. In such embodiments, controlling the temperature and/or the rigidity of the interface provides the ability to control and tune dry adhesion.

Example 3

Figure 11:
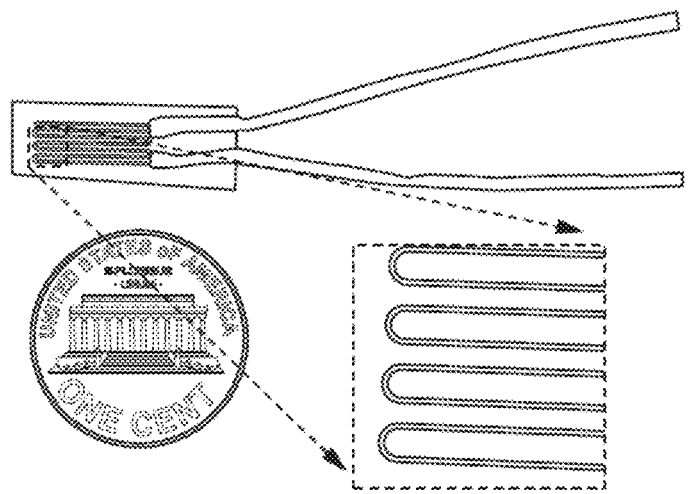
FIG. 11 is an image showing an exemplary composite structure comprising a PDMS shell and an embedded heater component comprising microfluidic channels filled with a low melting point alloy.

In this example, micro-scale composite structures are described. Micro-scale composite structures provide the advantages of faster response times, lower actuation voltages, and the ability to utilize fibrillar structures with the ability to conform to rougher surfaces. Such composites comprise micro-scale channels filled with a liquid metal, Galinstan; these channels are formed using a photolithography-based fabrication method. In one embodiment, a composite structure comprising a LMPA-based core component is prepared wherein the LMPA fills a channel having cross sectional dimensions of 84 μm×80 μm, and a length of 11.4 cm (FIG. 11). In some embodiments, the response time of the micro-scale composite structures can estimated. As a lower bound, assuming adiabatic conditions on the interface between the LMPA and the surrounding PDMS shell, the time needed to increase the temperature of the alloy by 25° C. by applying a voltage of 1 V can be estimated to be 0.25 seconds using conservation of energy principle. For an upper bound, assuming infinitely fast heat diffusion and uniform temperature distribution throughout the composite containing the channel, the time needed to achieve the same temperature increase with the same voltage is estimated to be 7 seconds. In some embodiments, real time activation using a battery can be implemented in micro-scale structures.

Example 4

Figure 12:
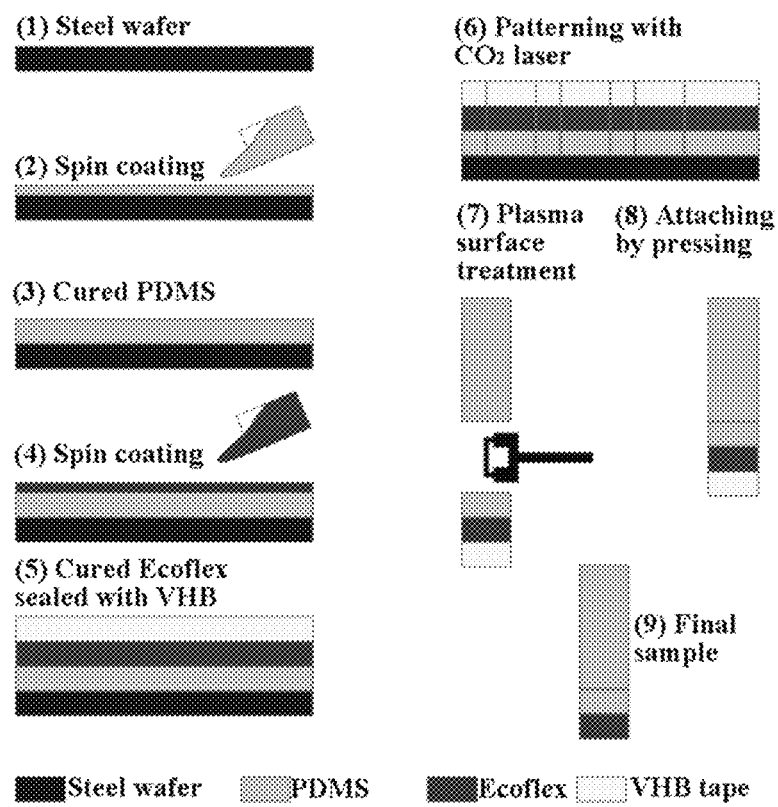
FIG. 12 is a schematic diagram showing exemplary fabrication steps for making a composite structure comprising PDMS and a thin layer of Ecoflex® material.
Figure 13:
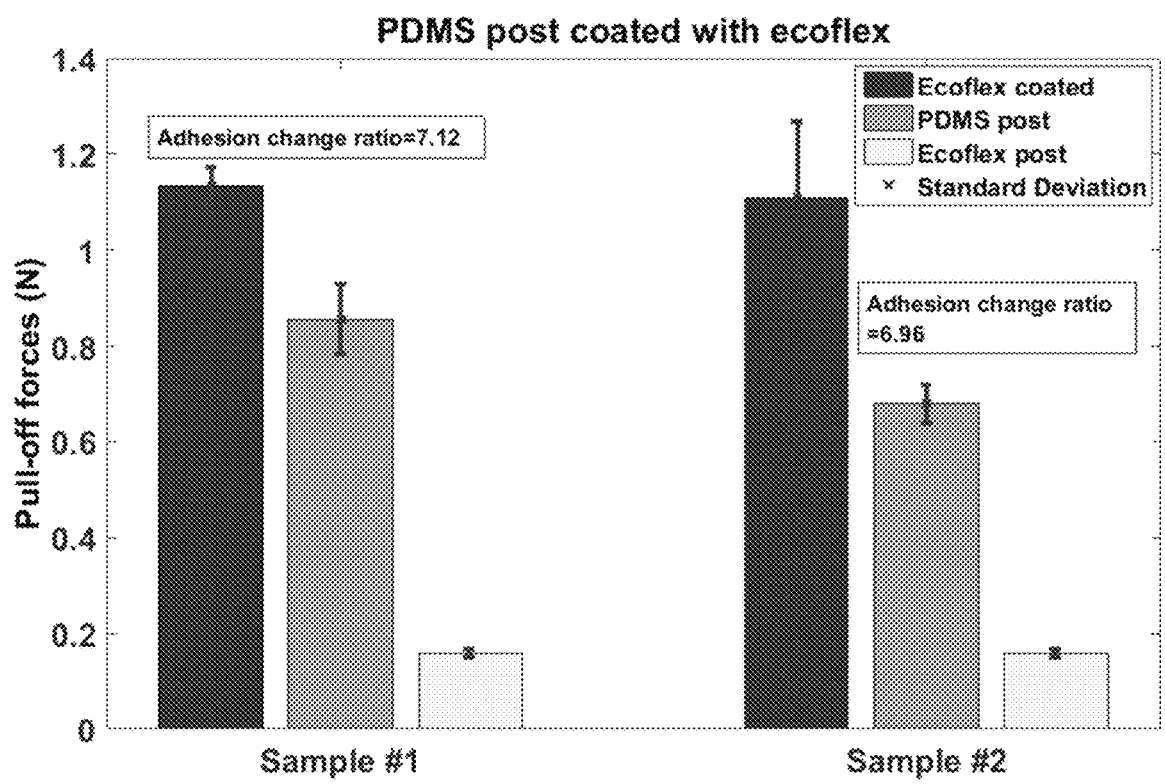
FIG. 13 is a bar graph illustrating results from using the composite structure of FIG. 12, wherein enhanced pull-off forces are observed due to the presence of a soft Ecoflex® layer attached to the shell component.

In addition to soft composites containing a single component with tunable stiffness for dynamic dry adhesion control, multi-level dry adhesion control can be achieved. In this example, two (or more) active components and two (or more) elastomers integrated together are used to provide multi-level dry adhesion control. In some embodiments, a fabrication technique is used to attach a thin layer of Ecoflex® material uniformly to a stiffer rectangular-shaped PDMS shell comprising a core component. FIG. 12 illustrates the fabrication steps that can be used, which can include a combination of spin coating, $CO_2$ laser patterning, VHB tape, and oxygen plasma treatment. Dry adhesion measurements on the composite structures (FIG. 13) show that the pull-off force of a PDMS-based composite structure with a 300 μm thick Ecoflex® layer is higher than that of a PDMS-based composite structure without Ecoflex® and even that that of an Ecoflex®-based composite structure (e.g., higher by a factor of ~7 when the composite is compared to pure Ecoflex®). This example establishes the feasibility of attaching thin soft elastomer layer to stiffer elastomer composite structures. In some embodiments, thin Ecoflex® layers with embedded LMPA structures can be positioned near the surface of the PDMS-based composites that contain CPBE cores. This allows multi-level dry adhesion control through independent tuning of stiffness of two components: direct tuning of the rigidity and/or temperature of the layer closet to the surface, or tuning of the stiffness in the core to affect stress distribution and, in turn, dry adhesion, or tuning both components at the same time. Bonding of the Ecoflex® layers can be achieved through surface plasma treatment on both sides of the Ecoflex® layer and then applying pressure to couple it to the end of the PDMS-based composite structure. By reducing the modulus of the interface layer using the Ecoflex® layer, the overall adhesion strength will increase. Rigidity tuning of such composites can be evaluated using different core components. In one embodiment, a PDMS-based composite structure comprises embedded channels filled with EGaIn/Galinstan and another PDMS-based composite structure comprise channels filled with Field's metal. The method for filling microfluidic channels with the Field's metal is the same as filling with a liquid metal, except that the Field's metal should be conducted in an environment above the melting point of Field's metal (which is 62° C.). Thermal effects on dry adhesion can be tested by heating samples with channels filled with EGaIn/Galinstan liquid metal and then conducting pull-off force characterization (there is no large rigidity change in the core in this case because the melting temperature of this metal is below room temperature). The Field's metal on the other hand is solid at room temperature and thus heating the system filled with this will change both the rigidity and temperature.

Example 5

In this example, a PDMS composite structure can be made and comprises a rigidity tunable core component and a surface heating layer. This composite structure can provide a dry adhesion change ratio on the order of 50 by combining the tuning effects exhibited on both the core and the interface.

Example 6

Figure 14:
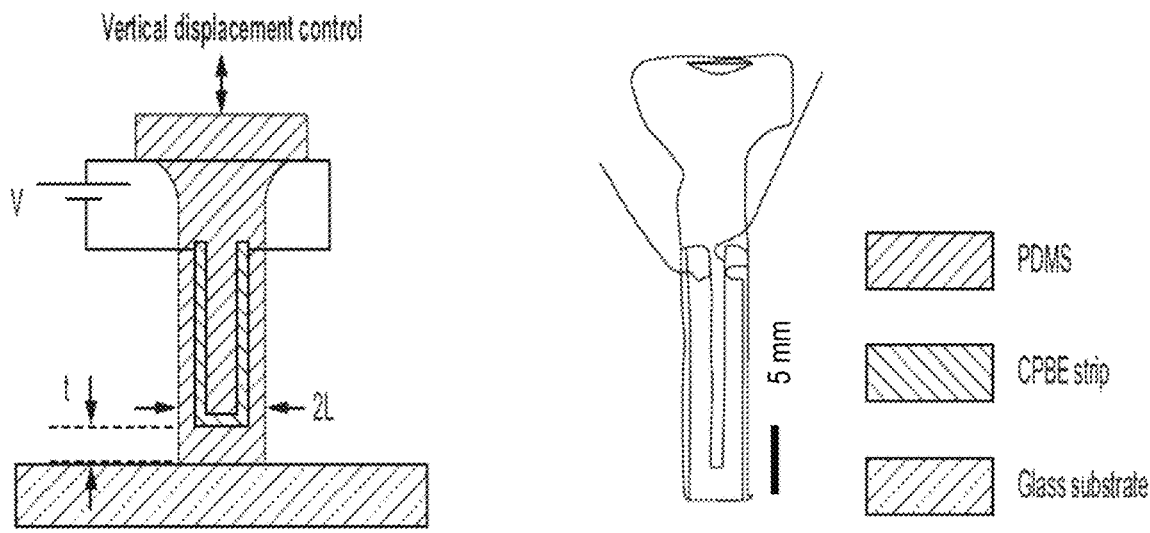
FIG. 14 provides a schematic of electrical activation and photograph of a composite post sample, comprising PDMS embedded with a U-shaped CPBE core and wires for electrical connection.

In this example, PDMS shell embodiments with varying PDMS thicknesses at the adhesion interface are described. In this example, the composite post had a u-shaped CPBE core strip with cross-sectional dimensions of 2.4 mm×1.5mm and a total length of 38 mm embedded within a PDMS shell. The electrical resistance of the CPBE core was 400 ohms. The composite post had a rectangular cross section of 3 mm×5 mm. The thickness of the soft PDMS shell at the interface was denoted t, as shown in FIG. 14.

Figure 15A:
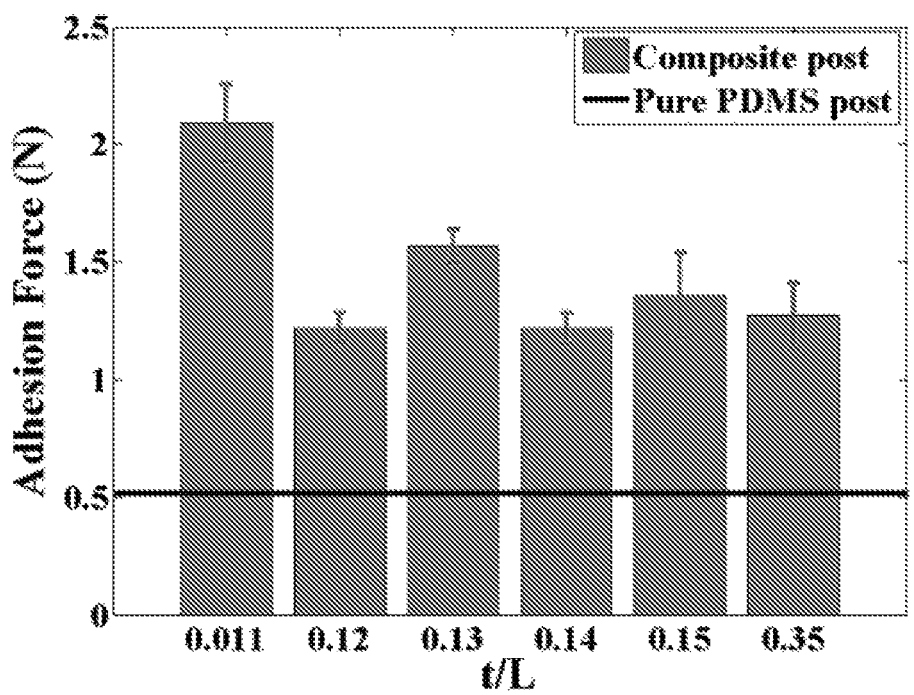

FIG. 15A shows a comparison between the adhesion forces measured on non-activated composite posts with varying t and a homogenous PDMS post. The results show that the stiff core clearly enhances dry adhesion. Without being limited to a single theory, it currently is believed that having a rigid core (>10× stiffer than the shell) that is sufficiently close to the interface leads to a more uniform stress distribution at the interface, and therefore enhanced adhesion. The PDMS post with a rectangular cross section of 3 mm (2 W)×5 mm (2 L) has an adhesion force of 0.52±0.03 N, while for the composite posts with the same bottom surface geometry, when 0.1<t/L<0.15, the adhesion force is between 1.21±0.06 N and 1.56±0.07 N, a 2- to 3-times adhesion enhancement relative to that of the homogenous PDMS post. In some embodiments, it was observed that the thinner the soft layer near the interface, the higher the adhesion. As t/L decreases to 0.011, the adhesion force increases further to 2.1 N, which is 4× stronger than that of the control sample.

Figure 15B:
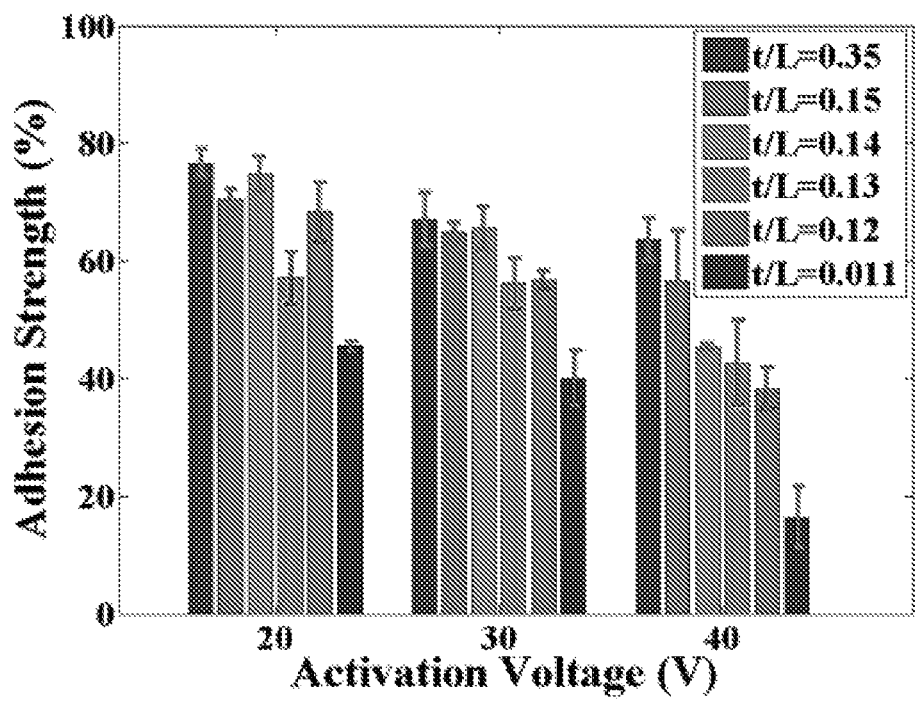

The U-shaped CPBE core was activated and then cooled down at ambient temperature to obtain reversible adhesion tuning. FIG. 15B shows the adhesion strength reduction (compared to corresponding nonactivated cases in FIG. 15A) of the composite posts, when the core was activated and subsequently cooled down passively under ambient conditions for multiple cycles of adhesion testing.

Results from this example show that the adhesion strengths vary with CPBE activation voltages and t/L values, but there was no significant change after multiple cycles of activation. In general, the adhesion strength is reduced more in posts with smaller t/L (e.g., see FIG. 15B). For 0.1<t/L<0.15, the adhesion strength was reduced to 38%-74% of the nonactivated cases, depending on the activation voltages. When t/L increased to 0.35, the adhesion strength was reduced to 64%-77% of its nonactivated values. When the t/L ratio was small (e.g. t/L=0.011), the adhesion strength reduction was the most significant, and was as low as 17% of its non-activated values, when the applied voltage is 40 V, which is even lower than that of the homogenous PDMS post. Without being limited to a particular theory, it currently is believed that under 40 V, the CPBE strip is fully activated, whereas for 20 V and 30 V, the CPBE strip is only partially activated. In addition, a coupled temperature effect may be involved, since the hot activated CPBE strip that is very close to the adhered interface (t/L=0.011, t=27 μm) increases the temperature at the interface and thus lowers the adhesion strength.

Figure 15C:
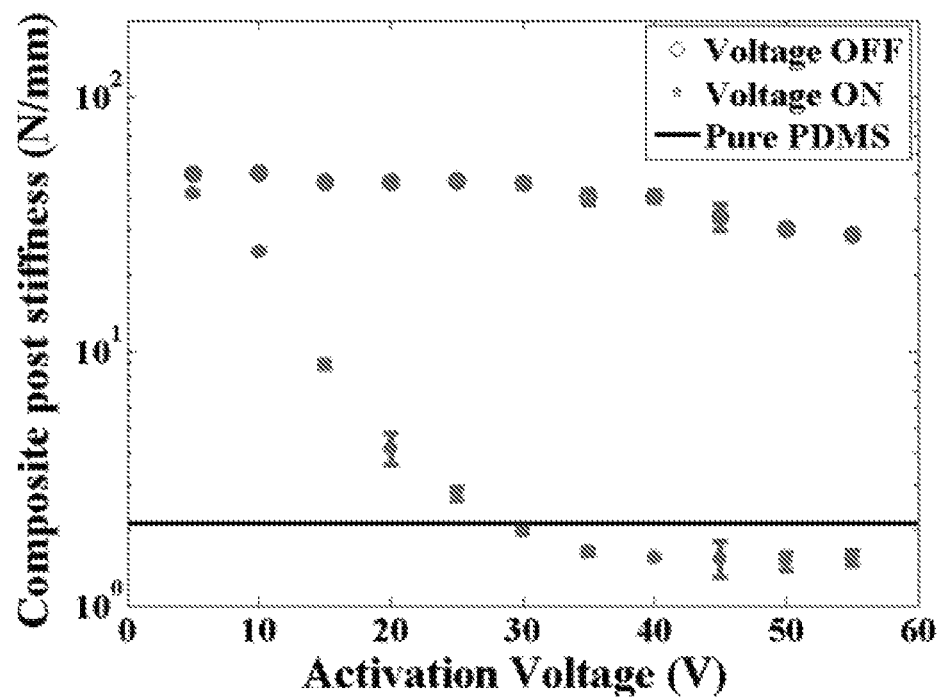

The stiffness of the composite post under different activation conditions was also evaluated, as shown in FIG. 15C. The stiffness was defined as the slope of the unloading curve in the adhesion pull-off force experiment. One composite sample with a t/L=0.12 was used. For the results in FIG. 15C, the composite post was activated for 2 minutes, cooled down for 10 minutes to ensure it came back to room temperature, and activated again to observe the relationship between stiffness and activation voltage. Activation voltages were varied from 5 V to 55 V in increments of 5 V. When the activation voltage was greater than 30 V, the stiffness of the composite post was similar to that of the pure PDMS post; however, when the activation voltage was less than 30 V, the stiffness of the composite post was considerably higher than that of the pure PDMS post, which indicates that the CPBE strip may not be fully activated. This is consistent with the adhesion measurements in FIG. 15B, when the applied voltage is 20 V. The nonactivated composite post had a stiffness of 50 N/mm. After repeated activation, its nonactivated stiffness decreased from 50 N/mm to around 30 N/mm for 55 V (FIG. 15C). This result is believed to result from the fact that the embedded CPBE strip is damaged slightly after each activation and cooling cycle if the applied voltage is too high. However, even with the lowest stiffness of 30 N/mm, the composite post was still about 15-times stiffer than the pure PDMS post (~2 N/mm). The U-shaped cPBE strip can still function as the tunable stiffness core for the soft composite post after damage, since it is more than 10-times stiffer than the shell.

Figure 15D:
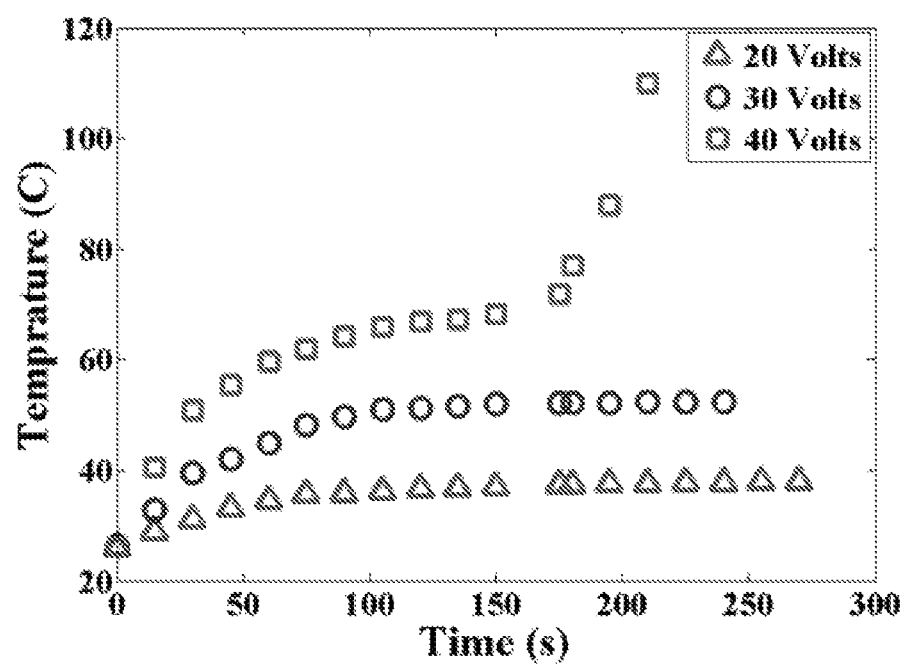

FIG. 15D shows the temperature evolution of the composite post surface in contact with a glass substrate for activation voltages of 20 V, 30 V and 40 V, measured by a thermocouple placed at the adhered interface. For 20 V and 30 V, the interface temperature increased, and then stabilized after 80 seconds and 120 seconds, respectively, while for 40 V, the interface temperature increased at a higher rate and after 3 minutes the cPBE strip burns, as indicated by the exponential temperature rise. In some examples, an activation time of 120 seconds protects the cPBE strip from being destroyed completely. Using 30 V for activation avoids damaging the sample permanently during cyclic use and also ensures complete activation of the sample.

Finite element modeling (FEM) using ANSYS was performed to examine the stress distribution across the adhered interface for composite posts with different geometries. Quarter symmetry was exploited to reduce the model size. The model geometry matches the xamples. The thickness of the PDMS shell close to the interface, t, was varied between 27 μm and 875 μm, to match the t/L ratios that were evaluated. The specific mesh for each model was determined through a convergence study. PDMS and CPBE were assumed to be isotropic, homogeneous, and linearly elastic with Poisson's ratio of 0.49 and 0.4, and Young's modulus of 2.1 MPa and 175 MPa (nonactivated), respectively. When activated, $E_{CPBE}$ was assumed to be equal to $E_{PDMS}$, which is consistent with results in FIG. 15C. A fixed displacement boundary condition was imposed to the adhered interface of the post. The interface between the PDMS and the CPBE parts was modeled as perfectly bonded. Normal loading was applied by displacing the nodes along the top of the post an equal amount in the z-direction, with the x, y directions free to displace.

Figure 16A:
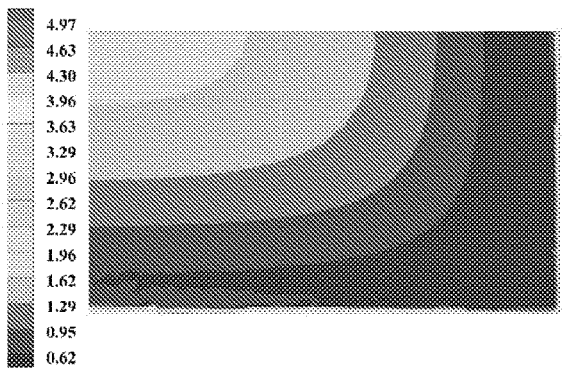
FIGS. 16A-16D show normalized normal stress distributions for various t/L values on the adhered interface of a representative composite post of FIG. 14, wherein the stresses are normalized using the average normal stress at the adhered interface and results are shown for one quarter of the contact area.
Figure 16B:
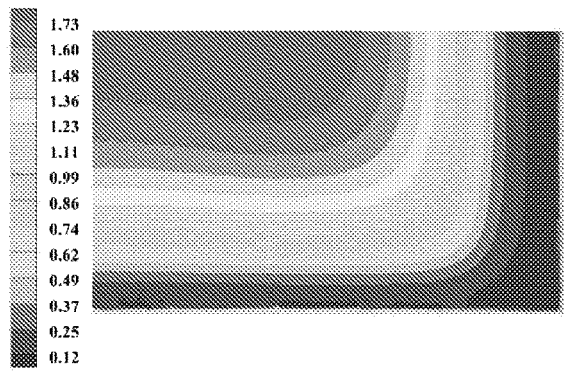
Figure 16C:
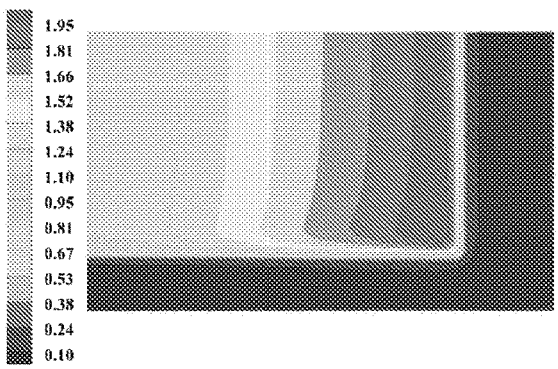
Figure 16D:
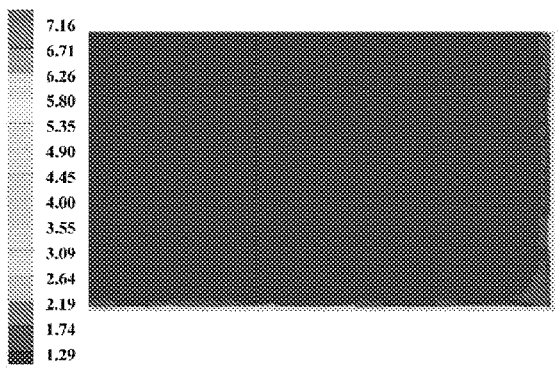

FIGS. 16A-16D show the FE-predicted normalized normal stress distributions at the adhered interface. The exact stress values at the edge of the post are sensitive to the mesh size due to the presence of singularity. Regardless, the FE results provide an understanding of how the normal stress distribution at the adhered interface changes with the post geometry. At large t/L ratios, the stress is highest at the edge of the post (FIG. 16A, t/L=0.35). As t/L decreases, the stress at the center increases while the stress at the edge decreases. At a certain t/L value, the highest normal stress will shift to the center and continue to be there as t/L is decreased (FIG. 16B, t/L=0.12). However, if t/L decreases further, the stress peak moves away from the center toward the edges of the rectangular projection of the CPBE core onto the adhered interface (FIG. 16C). Without being limited to a particular theory, it currently is believed that this trend means the location of the highest normal stress at the adhered interface, for the elastic modulus mismatch range of the materials used in this example (~84), can move to a point between the edge and the center of the post bottom surface. Since for the samples the edge regions have the most defects due to fabrication, when the peak stress is in the center and the stresses close to the edges are low, it is more difficult for the cracks to initiate and propagate from the defects, which will result in a higher adhesion force. Further FE simulations show that the critical value of the t/L at which the normal stress peak point starts moving away from the center, decreases as the elastic moduli mismatch ratio of the rigid core and the soft shell increases. FIG. 16D shows the normalized stress distribution at the adhered interface for the activated post. After activation, the stress is very localized at the edge and that the normalized stress values are significantly higher. Measurements also show that the pull-off force and consequently the adhesion strength of the fabricated composite post depends on the t/L ratio and the activation voltage of the U-shaped CPBE strip (FIGS. 15A and 15B), which is consistent with the changes in stress distribution observed here.

To investigate the interfacial failure mechanism, the crack initiation and propagation process during post detachment was video-recorded. For a sample with t/L=0.22 when the post is not activated, the crack starts from a location between the center and the edge (closer to the center) and then move towards the edges. When the composite post is fully activated, the crack starts from the edge, which corresponds to a lower adhesion strength and is consistent with the FE results discussed above. For the nonactivated sample with t/L=0.35, and all of the activated samples presented in FIG. 15B, the interfacial cracks initiate from the edge of the PDMS shell. For nonactivated samples with t/L=0.12, 0.13, 0.14, and 0.15, the interfacial cracks initiate from the center of the interface. For nonactivated samples with t/L=0.011, interfacial cracks initiate from the edge of the rectangular projection of the CPBE core onto the interface.

As a demonstration of this composite post with tunable dry adhesion for use in pick-and-place applications, a composite post with a t/L ratio of 0.16 was shown to pick up a 15.9 g dead weight and hold it for 3 hours without dropping when the rigid core has not been activated. Once the CPBE core was activated with an electrical voltage of 80 V, the dead weight drops after around 20 seconds, which clearly shows the concept of tunable dry adhesion with stiffness tuning. The application of 80 V for 20 seconds did not damage the samples, and this pick-and-release process could be repeated many times using the same composite post. After cooling down the sample at ambient temperature for 10 minutes, dry adhesion was completely recovered such that the composite post was able to pick up the 15.9 g dead weight for more than 3 hours without dropping again. In the nonactivated cases, the sample was manually detached from the glass substrate after 3 hours.

Figure 17:
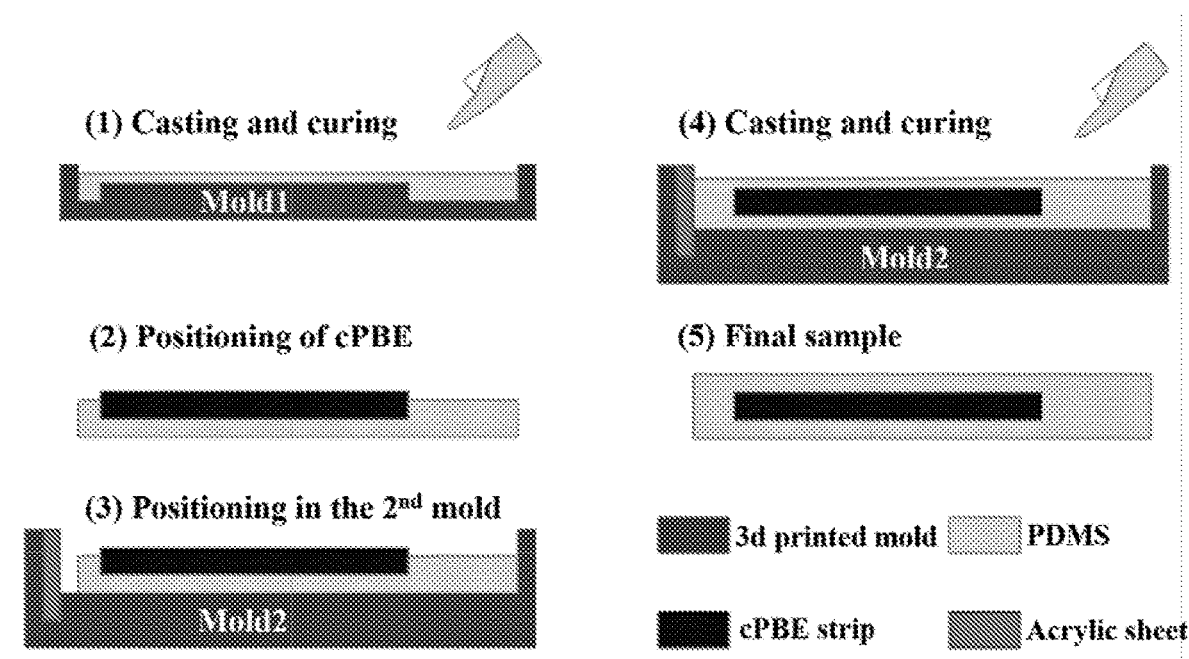
FIG. 17 illustrates a representative schematic of a method for making a composite structure described herein.

For this example, the T-shaped composite posts were fabricated with a multi-step additive manufacturing procedure illustrated schematically in FIG. 17. The CPBE core (U-shaped strip) was embedded in the PDMS post. The molds for casting were printed with a 3D printer (Object24, Stratatys Inc.). PDMS (Sylgard 184, Dow Corning Corporation, Midland, Mich.) with a 10:1 weight ratio of base elastomer to curing agent was mixed in a Thinky Mixer (AR-100, THINKY Inc.) for 10 minutes. It was then degassed using a vaccum oven (Across International, AccuTemp) for 10 minutes. The first mold was filled with PDMS, degassed for 10 minutes. The extra PDMS was removed by dragging a glass slide over the surfaces and the PDMS was then cured at 80° C. for one hour. This resulted in a layer of PDMS with a thickness of 1.5 mm with channels defined by the features on the bottom of the mold. The CPBE strip, with copper electrodes attached, was placed inside the channel of the PDMS layer and then the whole assembly was positioned in to the second mold. The second mold was slightly longer than the first mold. A smooth acrylic sheet was placed at the bottom to ensure a flat and smooth surface at the bottom of the final PDMS post. Uncured PDMS was poured in the second mold and degassed for 10 minutes, additional PDMS was removed, and the composite post was cured in an oven at 55-60° C. for 24 hours. A lower curing temprature was used to stay below the melting point temperature of the CPBE.

The adhesion measurements were performed using an Instron 5969 testing system with a 50 N load cell. The adhesion strength of the composite post to a smooth glass substrate was measured as a function of two parameters: (1) the activation voltage of the CPBE strip (2) the t/L ratio of the post. The glass substrate was fixed on a stage on the bottom of the test frame. A 3D-printed fixture was used to mount the composite post on the load cell, above the glass substrate. The post surface was aligned to be parallel with the glass substrate. In a typical adhesion experiment, the composite post was brought into contact with the glass at a speed of 10 μm/s to reach a compressive preload of 2 N. The post was held at this preload for 2 mintes and then it was retracted at a speed of 5 μm/s to a compressive preload of 0.6 N. The preload was reduced to 0.6 N to avoid buckling of the composite post that can occur when a preload of 2 N was applied due to thermal expansion of the composite structure during the electrical activation of the CPBE core. The U-shaped CPBE strip was activated with an electric voltage for 2 mins. Finally, the post was retracted at 50 μm/s. The adhesion force is defined as the peak tensile force measured during retaction.

Example 7

In this example, composite structure embodiments with varying LMPA channel heights and sealing layer thicknesses on adhesion are described. In this example, as shown in FIG. 18, the main body portion had 200 μm wide LMPA channels that were 400 μm tall and 700 μm from any outer edge with an internal spacing between channels of roughly 500 μm. The channels had a total length of approximately 122 mm. The short edge of the composite structure was 9.12 mm and the long edge 17.17 mm. The sealing layer thickness (V in FIG. 19, tin FIGS. 21A-21C and 22) was varied from 200 to 1200 μm.

Figure 20:
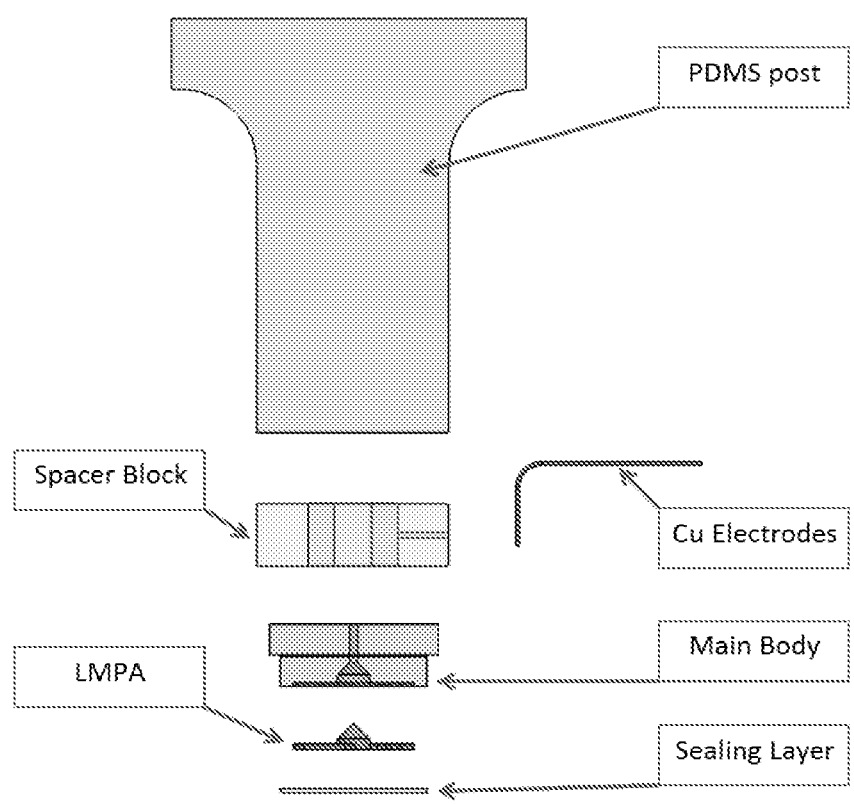
FIG. 20 illustrates an exploded side view of an embodiment of a composite structure comprising the main body of FIG. 18.

The composite structure was manufactured using 3-D printing techniques to cast the post, spacer, and main body of the device (see FIG. 20). As shown in FIGS. 19 and 20, a top shelf portion was added to ensure clean removal of the cured PDMS from the mold. Once a mold was ready to use, a 10:1 mixture of PDMS (Sylgard 184) was carefully poured in. A glass slide was scraped across the top to remove any excess material to ensure a level surface for later assembly. The mold is then placed into a vacuum oven at room temperature for de-gassing, removing any pockets of air in the PDMS resulting in a uniform consistency. Once level and de-gassed, the molds are placed into the curing oven at 85° C. for about 45 minutes, after which, they are removed and allowed to cool before removal of components from the mold. Upon removal, a 0.5 mm biopsy punch was used to complete the wells on the main body for electrodes and holes for threading the copper wires through on the spacer.

The sealing layer was made with a 10:1 ratio PDMS and spin coated on a glass wafer to varying thicknesses from 200-1200 microns and cured in the oven for about 20 minutes at 85° C. The main body and the sealing layer were both exposed to corona discharge (Model BD-20 Electro-Technic Products, INC) roughly 30 seconds on each surface for attachment. Once attached, the assembly was placed on a hot plate at 45° C. for 5 minutes, removed, and either left overnight or a for a few hours to ensure a mature bond.

Once the assembly had time to settle, the sample was removed from the glass wafer by carefully cutting around the edge with a razor blade and slowly peeling it away. The removal process was the first test of the bond between the main body and the sealing layer. The sample was then be placed in an oven at 80° C. along with a syringe and a petri dish full of LMPA (Rotol 17F/47C, 44.70% Bismuth, 5.30% Cadmium, 22.60% Lead, 8.30% Tin, and 19.10% Indium). The LMPA melts at 47° C. and having the environment at 80° C. allowed enough time with the oven door open for low pressure injection of the LMPA into the channels ensuring that no air bubbles were introduced and reducing unnecessary bulging of the channels that could potentially cause delamination. Once the channels were injected, copper electrodes coated in silver paste were inserted into the wells and the sample was removed from the oven and allowed to cool.

To ensure a flat surface for attachment to the post, the spacer block was attached. The spacer also acted as a support structure for the electrodes so they did not move under compression and possibly compromise the device by puncturing the sealing layer. The copper wire electrodes were then threaded through the side of the spacer block and the resistance of the device was checked. If the device had resistance, the wells of the spacer block would be filled with PDMS and cured, sealing the sample. If the device did not have resistance, the device would be placed back in the oven to melt the LMPA to re-position the electrodes to form a complete circuit. Resistance was checked one last time before attaching to the bottom of the post with more PDMS concluding the fabrication process. Corona Discharge was used to attach the PDMS sealing layer to the PDMS post, which has the lowest PDMS-PDMS bonding strength. Low bonding strength mitigates the LMPA leakages which can occur under high adhesion forces.

During testing, sample B of the 400 µm experienced a tear on the surface of the sealing layer resulting in material loss and ultimately a catastrophic failure. This was the only sample to fail of such events, although many samples had to be repaired on the hotplate throughout testing. This was more common in the samples with thinner sealing layers than in the samples with thicker sealing layers.

Figure 21A:
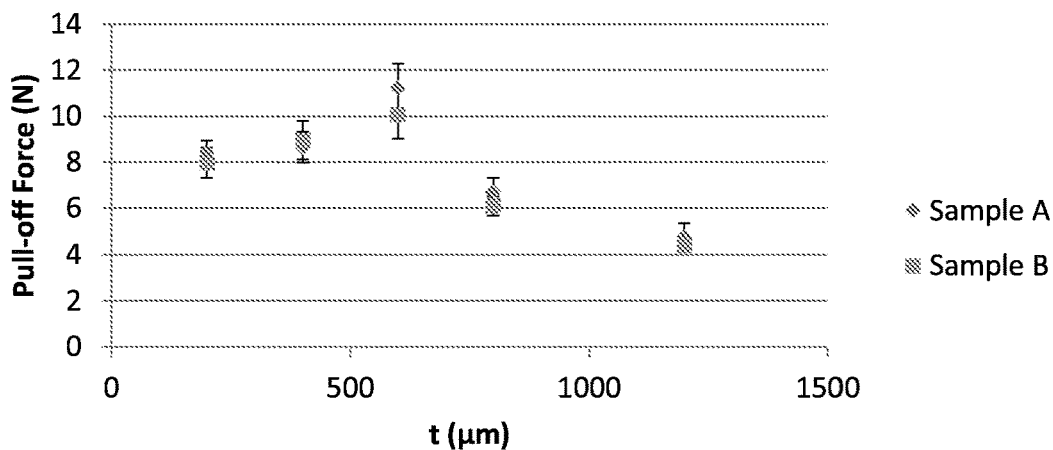
Figure 21B:
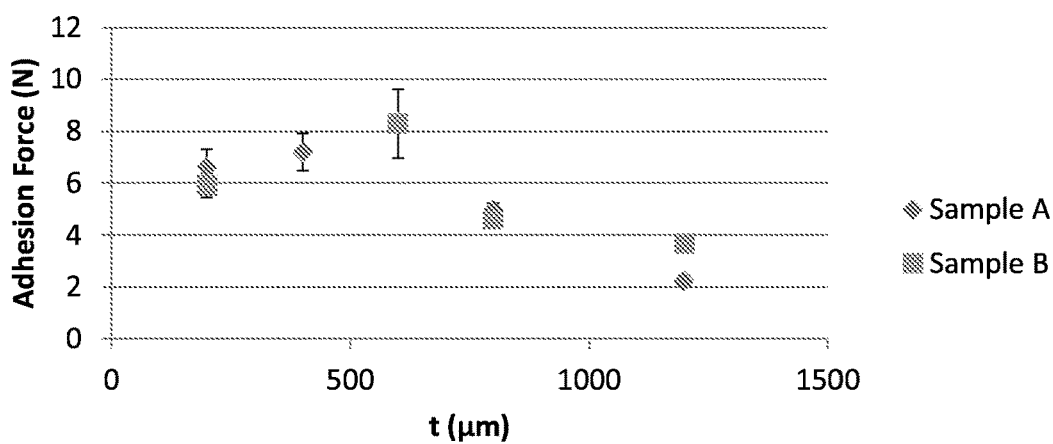
Figure 21C:
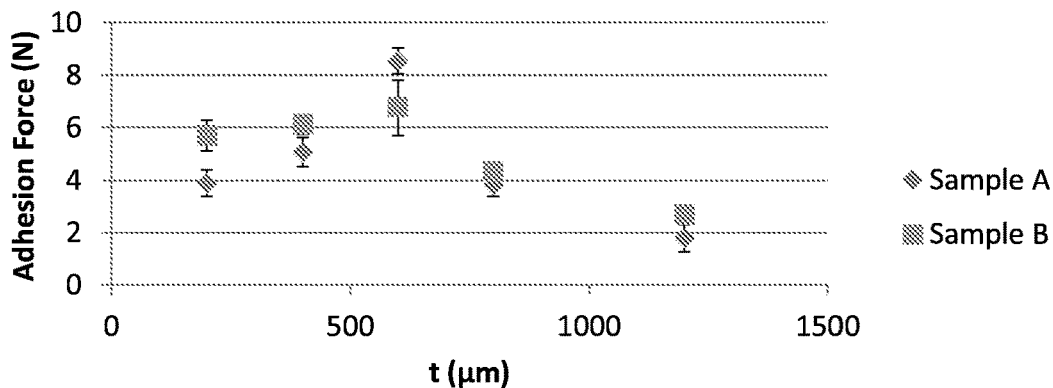
Figure 22:
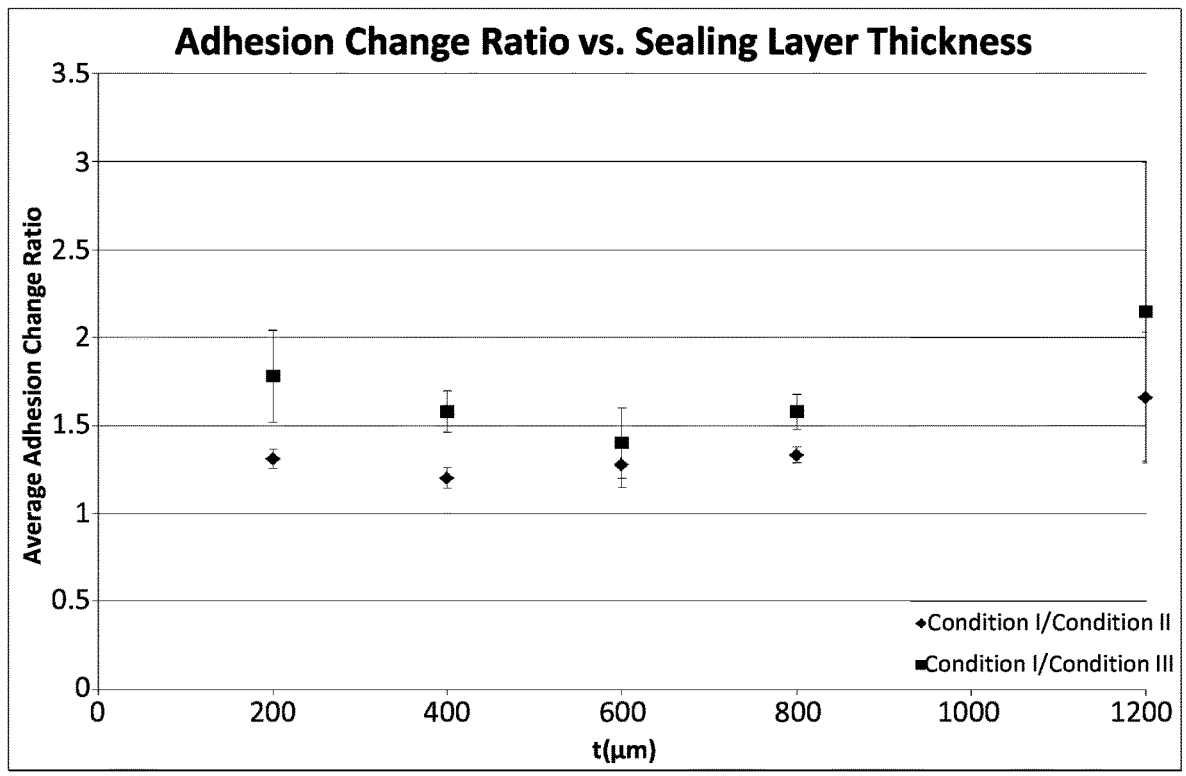
FIG. 22 is a graph illustrating the adhesion change ratio as a function of the sealing layer thickness obtained from analyzing the embodiment of FIGS. 18 and 19.

The composite structures were tested under three differing testing conditions, the results of which are shown in FIGS. 21A-21C. Condition I was a "cold-cold" test wherein the composite structure was not activated, Condition II was a "cold-hot" test where the composite structure was activated while in contact with the surface, and Condition III was a "hot-hot" test wherein the composite structure was activated prior to contacting the surface. A maximum adhesion was observed at a sealing layer thickness of 600 µm. The tunable adhesion capabilities of the devices were determined by the Condition I and Condition II results. Results show that the ratio of adhesion change remained substantially constant for all sealing layer thicknesses, as shown in FIG. 22.

Example 8

Figure 23:
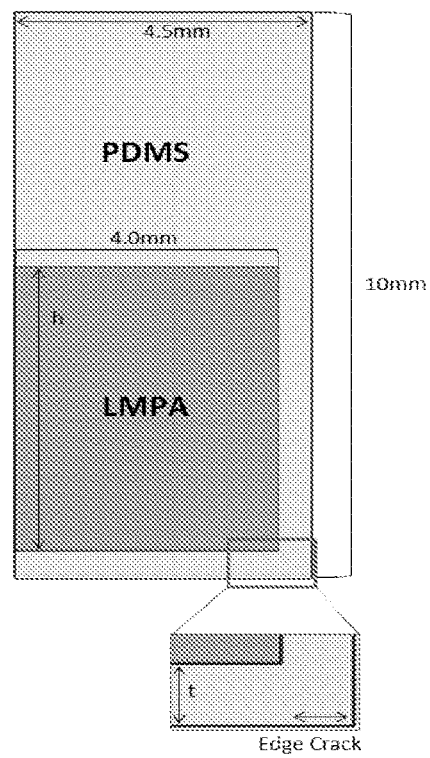
FIG. 23 is a schematic illustration of a 2D quarter model of the composite shown by FIGS. 18 and 19 and comprising an LMPA core.

In this example, the effect of channel height and sealing layer thickness are examined. To do so, a 2-D quarter size model of a PDMS post with an embedded LMPA layer is simulated with varying sealing layer thickness (t) and LMPA layer heights (h) (see FIG. 23). Also, the model was subjected to a tension force with no specified crack location. Multiple stress distribution plots of varying LMPA layer height and sealing layer thickness were generated under this model. Results showed that as the height of the LMPA layer gets larger, the stress distribution maximum moved closer to the center, while the lower layers resulted in high stress concentrations closer to the edge signifying an edge crack formation. With this, an edge crack initiation was assumed and simulations were then run to determine the LMPA and sealing layer thicknesses and their effects on the adhesion strength. A fixed displacement boundary condition was imposed on the adhered interface, while the interface between the PDMS and LMPA parts was modeled as perfectly bonded. Normal loading was applied by displacing the nodes along the top of the post in the z-direction; the displacement in x-y plane was free, which represents the fact that the post was held with a rigid fixture in the experiments.

Figure 24:
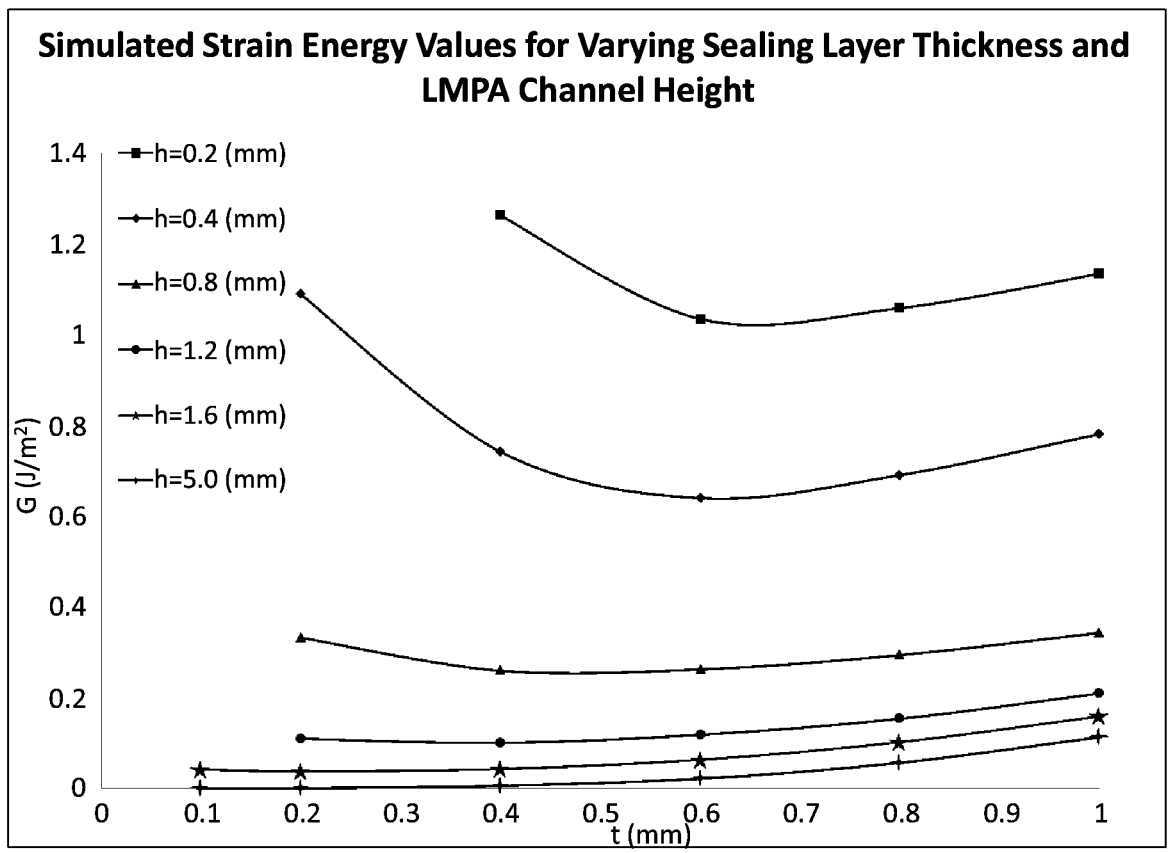
FIG. 24 shows results of FEM simulations used to evaluate LMPA layer thicknesses of 400 μm and 600 μm for the composite of FIG. 23.

The results are shown in FIG. 24. This example revealed that both the LMPA layer and the sealing layer thicknesses have an effect on strain energy and by proxy, the adhesion strength.

More specifically, the devices fabricated for this example had a channel height of 400 µm with varying sealing layer thickness of 200 µm, 400 µm, 600 µm, 800 µm, and 1200 µm. FE simulations showed an expected maximum adhesion force with a sealing layer thickness of 600 µm for samples with LMPA layer thickness of 400 µm due to the least amount of strain energy being generated.

Figure 25:
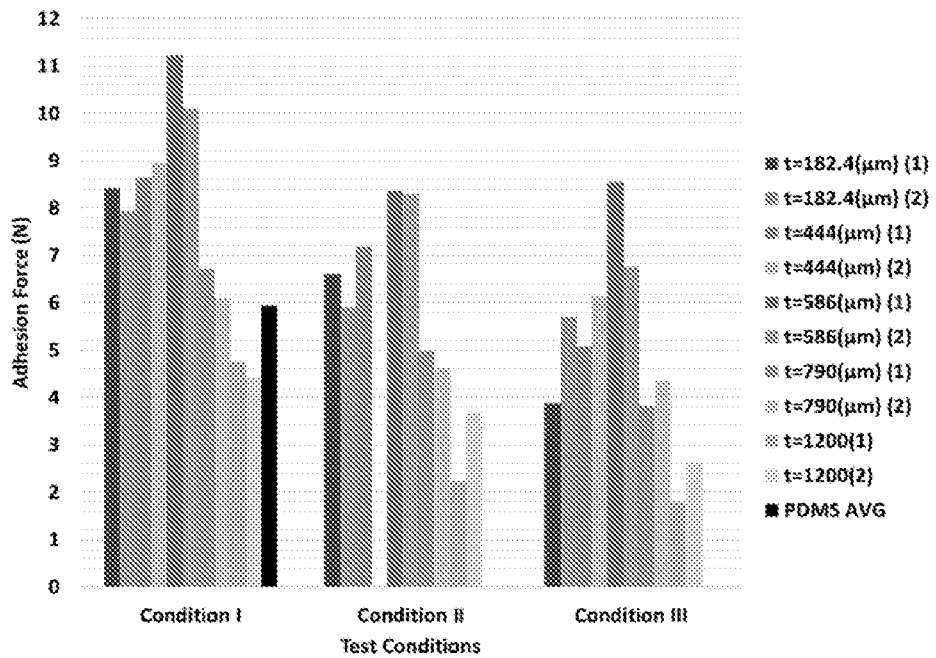
FIG. 25 shows a summary of the adhesion data for two representative composite embodiments having different LMPA layer thicknesses for the composite of FIG. 23.

To display the adhesion change capabilities of the device, a piece of glass is attached to a 600 µm embodiment ("A sample") and a 400 µm embodiment ("B sample") and an aluminum weight of 4.46 N is attached to the glass. Conditions similar to Conditions I, II, and III of Example 7 are used. Condition I is first used to obtain a baseline adhesion time that results in a total of 22 seconds before the weight is released naturally. Then Condition II is used to see if the tunable adhesion can be observed. The weight is picked up and held for approximately six seconds before applying 5.5 volts, activating the sample and releasing the weight in less than two seconds. A summary of the adhesion data used for the A and B samples is provided by FIG. 25.

In view of the many possible embodiments to which the principles of the disclosed subject matter may be applied, it should be recognized that the illustrated embodiments are only preferred examples of the disclosed technology and should not be taken as limiting. Rather, the scope is defined by the following claims. We therefore claim as our invention all that comes within the scope and spirit of these claims.

We claim:

1. A product, comprising:
   a substrate; and
   a composite structure including a shell component comprising
      a flexible elastomer material;
      a core component comprising a rigidity tunable material or structure;
      one or more conductive wires; and
      a heater component, comprising an elastomer configured with one or more channels comprising a low melting point alloy,
   wherein the substrate is adhered to the composite structure by dry adhesion and wherein the heater component is attached to a portion of the composite structure that is in contact with the substrate.

2. The product of claim 1, wherein the substrate is a substrate comprising a flat, rigid, smooth surface.

3. The product of claim 1, wherein the substrate is a semiconductor wafer, display, glass sheet, or smooth metal components.

4. The product of claim 1, wherein the rigidity tunable material is a conductive propylene-based elastomer, a low melting point alloy, or a combination thereof; a magnetorheological elastomer; or an electrorheological elastomer.

* * * * *